US007849790B2

(12) United States Patent
Fortier et al.

(10) Patent No.: US 7,849,790 B2
(45) Date of Patent: Dec. 14, 2010

(54) SINGLE RAM BALER

(75) Inventors: Paul Fortier, Plessisville (CA); Marc Massé, Princeville (CA)

(73) Assignee: Industries Machinex Inc., Plessiville, Quebec (CA)

( * ) Notice: Subject to any disclaimer, the term of this patent is extended or adjusted under 35 U.S.C. 154(b) by 0 days.

(21) Appl. No.: 12/114,457

(22) Filed: May 2, 2008

(65) Prior Publication Data

US 2009/0272282 A1 Nov. 5, 2009

(51) Int. Cl.
*B65B 13/02* (2006.01)
*A01F 15/14* (2006.01)

(52) U.S. Cl. ......................... 100/3; 100/19 R; 100/179; 100/192; 100/245; 100/4

(58) Field of Classification Search ..................... 100/3, 100/7, 8, 11, 19 R, 31, 94, 95, 98 R, 177, 100/178, 179, 191, 192, 215, 218, 240, 245, 100/269.01, 295, 4, 49
See application file for complete search history.

(56) References Cited

U.S. PATENT DOCUMENTS

| | | | | | |
|---|---|---|---|---|---|
| 0,674,836 | A | | 5/1901 | Carter | |
| 0,778,446 | A | | 12/1904 | Clark et al. | |
| 1,049,704 | A | | 1/1913 | Green | |
| 3,253,537 | A | | 5/1966 | Porter et al. | |
| 3,350,999 | A | * | 11/1967 | Morse | 100/43 |
| 3,577,911 | A | | 5/1971 | Morse | |
| 3,587,448 | A | * | 6/1971 | Hemphill | 100/3 |
| 3,667,377 | A | * | 6/1972 | Persson | 100/19 R |
| 4,059,049 | A | * | 11/1977 | Tillgren | 100/41 |
| 4,121,515 | A | * | 10/1978 | Tea | 100/98 R |
| 4,125,068 | A | * | 11/1978 | Linnerz et al. | 100/19 R |
| 4,134,335 | A | * | 1/1979 | O'Rourke et al. | 100/98 R |
| 4,144,806 | A | | 3/1979 | Broussard | |
| 4,149,457 | A | | 4/1979 | Smith | |
| 4,489,648 | A | * | 12/1984 | Naaktgeboren | 100/191 |
| 4,584,935 | A | | 4/1986 | Luggen | |
| 4,651,610 | A | * | 3/1987 | Schwelling | 83/636 |
| 4,676,153 | A | | 6/1987 | Ast | |
| 4,750,418 | A | | 6/1988 | Naaktgeboren | |
| 4,787,308 | A | | 11/1988 | Newsom et al. | |
| 4,936,206 | A | | 6/1990 | Miles et al. | |
| 5,353,698 | A | | 10/1994 | Robbins | |
| 5,566,610 | A | | 10/1996 | Robinson et al. | |
| 5,832,815 | A | | 11/1998 | Bollegraaf | |
| 6,360,655 | B1 | | 3/2002 | Crespo Barrio | |
| 6,546,855 | B1 | | 4/2003 | Van Der Beek et al. | |
| 6,651,416 | B2 | | 11/2003 | Trelstad et al. | |
| 6,694,871 | B1 | | 2/2004 | Wildes et al. | |

* cited by examiner

*Primary Examiner*—Jimmy T Nguyen
(74) *Attorney, Agent, or Firm*—Alexandre Abecassis; Fasken Martineau DuMoulin LLP

(57) ABSTRACT

The present invention generally pertains to a single ram baler for baling recycled material. More specifically, the single ram baler of the present invention comprises a ram operable to move between a retracted position for receiving the recycled material and a tying position for allowing the compacted material to slightly expand before wiring the same.

17 Claims, 27 Drawing Sheets

SINGLE RAM BALER

FIELD OF THE INVENTION

The present invention generally relates to a single ram baler. More specifically, the present invention relates to a single ram baler having a ram assembly capable of reciprocating between retracted, tying and overstroke positions.

BACKGROUND OF THE INVENTION

Single ram balers typically comprise a housing in which is defined a compaction chamber. The housing accommodates a ram assembly comprising a hydraulic actuator having a first end connected to the back of the housing and a ram mounted to the second end of the hydraulic actuator. The ram assembly is operable to reciprocate between a retracted position and a tying position.

In the retracted position, the ram is positioned in the housing, such that recycled material can be fed in the compaction chamber, generally by gravity. Once a proper amount of recycled material has been fed in the compaction chamber, the ram assembly is actuated and the ram is forced frontwardly by the hydraulic actuator, toward the tying position. As the ram moves toward the tying position, the recycled material is also forced towards the front end of the housing, to which is connected an extrusion channel, where bales of compacted material provide a surface against which the material can be compacted.

Once it reaches the tying position, the ram is in alignment with a wire-catch assembly for wiring the newly formed bale. The wire-catch assembly typically comprises a plurality of needles mounted on the top of the housing. The needles go down through a plurality of wire-catch holes defined in the housing, through a corresponding plurality of wire-catch slots in the ram, to reach the bottom and the top metal wires extending proximal to the bottom and top walls of the housing, respectively. The needles then capture the bottom wires move upwardly to catch the top wires and exit the housing, where the wires are twisted to wire the bale. The ram then moves back toward the retracted position, the wires exiting the ram through slots defined in the front portion of the ram.

As the ram moves backward, the baled material tends to expand. However, because the bale is wired, such expansion is limited and the bale generally maintains its configuration. In some instances however, the expansion force of the baled material is capable of breaking the wires as the bale exits the extrusion channel. This is particularly true with material such as plastic bottles or containers, which tend to have a higher expansion coefficient than paper or cardboard, for instance.

To alleviate breakage of wire when such high expansion coefficient material is baled, the amount of material compacted, and the length of the bale produced can be reduced. Alternatively, some may choose to provide the baler with an additional wire assembly to cross-tie the bales. However, this solution is twice more expensive in wire cost per bale than using a single wire-catch assembly. Further, this solution is not ideal since it tends to reduce the overall speed of the baling process and to make the baling process less efficient.

In some other instance, the cross-section of the extrusion channel can be adjusted to allow expansion of the material prior to tying the same. The presence of other bales of material downstream in the extrusion channel tends to preclude sufficient expansion of the bale to be tied. Again, such additional expansion steps tend to reduce the overall efficiency of the process, because of the delay encountered for allowing expansion of the material. Further, as expansion tends not to be satisfactorily, the wires can still break and the material has to be rebated.

Therefore, it would be desirable to be provided with a single ram baler that overcomes at least one of the drawbacks associated with previous single ram baler configurations.

SUMMARY OF THE INVENTION

In order to address the above and other drawbacks, and in accordance with the present invention, there is disclosed a single ram baler for baling a material.

According to one embodiment, the single ram baler comprises a generally horizontal housing defining a compaction chamber therein. Defined on the housing is an opening for feeding the material in the chamber. The baler further comprises a ram mounted for reciprocation in the housing and an actuator operatively connected to the housing and to the ram. The actuator is operable to move the ram between a retracted position, a tying position and an overstroke position. The baler also comprises a wire-catch assembly operatively mounted to the housing. According to this embodiment, when the ram moves from the retracted position toward the overstroke position, the material fed in the compaction chamber is compacted into a bale while when said ram moves from the overstroke toward the tying position, the bale is allowed to expand and the wire-catch assembly is operable to wire the bale.

According to one aspect, the actuator comprises an hydraulic actuator. The hydraulic actuator preferably has a capacity ranging from about 10 metric tons to about 500 metric tons, and more preferably a capacity ranging from about 50 metric tons to about 300 metric tons, and even more preferably a capacity ranging from about 100 metric tons to about 200 metric tons.

According to one other aspect, the single ram baler comprises at least one of a preflap assembly and a shear blade assembly.

According to a further aspect, the single ram baler further comprises a lock mechanism adapted to maintain said ram in the tying position.

According to yet a further aspect, the single ram baler further comprises an extrusion channel operatively mounted to the housing. The said extrusion channel is adapted for resisting the passage of the material when said press ram moves from the retracted position to the tying position, thereby allowing the material to be compacted into a bale.

According to another aspect, the extrusion channel comprises a bottom wall, a top wall and a pair of side walls, each of the walls having a front end and a back end in connection with a front end of the housing. Preferably, at least one of said walls comprises a movable wall, where the at least one movable wall is connected to the housing via a hinge assembly.

According to one other aspect, the hinge assembly comprises a bracket assembly on the front end of the housing, a generally elongated hole extending through the at least one movable wall, at the back end thereof, and a rod fixedly mounted to the bracket assembly and extending through the elongated hole for allowing movement of the back end of the at least one movable wall relative to the housing.

According to a further aspect, the extrusion channel further comprises a clamp assembly for causing a portion of the at least one movable wall to move between an open position and a close position, where the portion comprises preferably at least one of the front end of the at least one wall and the back end thereof.

According to yet a further aspect, the wire-catch assembly is selected from a group consisting of a horizontal wire catch assembly and a vertical wire catch assembly.

According to another aspect, the material comprises a recycled material, and preferably a recycled material selected from the group consisting of paper, cardboard, plastic, metal and fabric.

These and other objects, advantages and features of the present invention will become more apparent to those skilled in the art upon reading the details of the invention more fully set forth below.

BRIEF DESCRIPTION OF THE DRAWINGS

Having thus generally described the nature of the invention, reference will now be made to the accompanying drawings, showing by way of illustration an illustrative embodiment thereof, and in which.

DESCRIPTION OF THE ILLUSTRATIVE EMBODIMENTS

Figure 1:
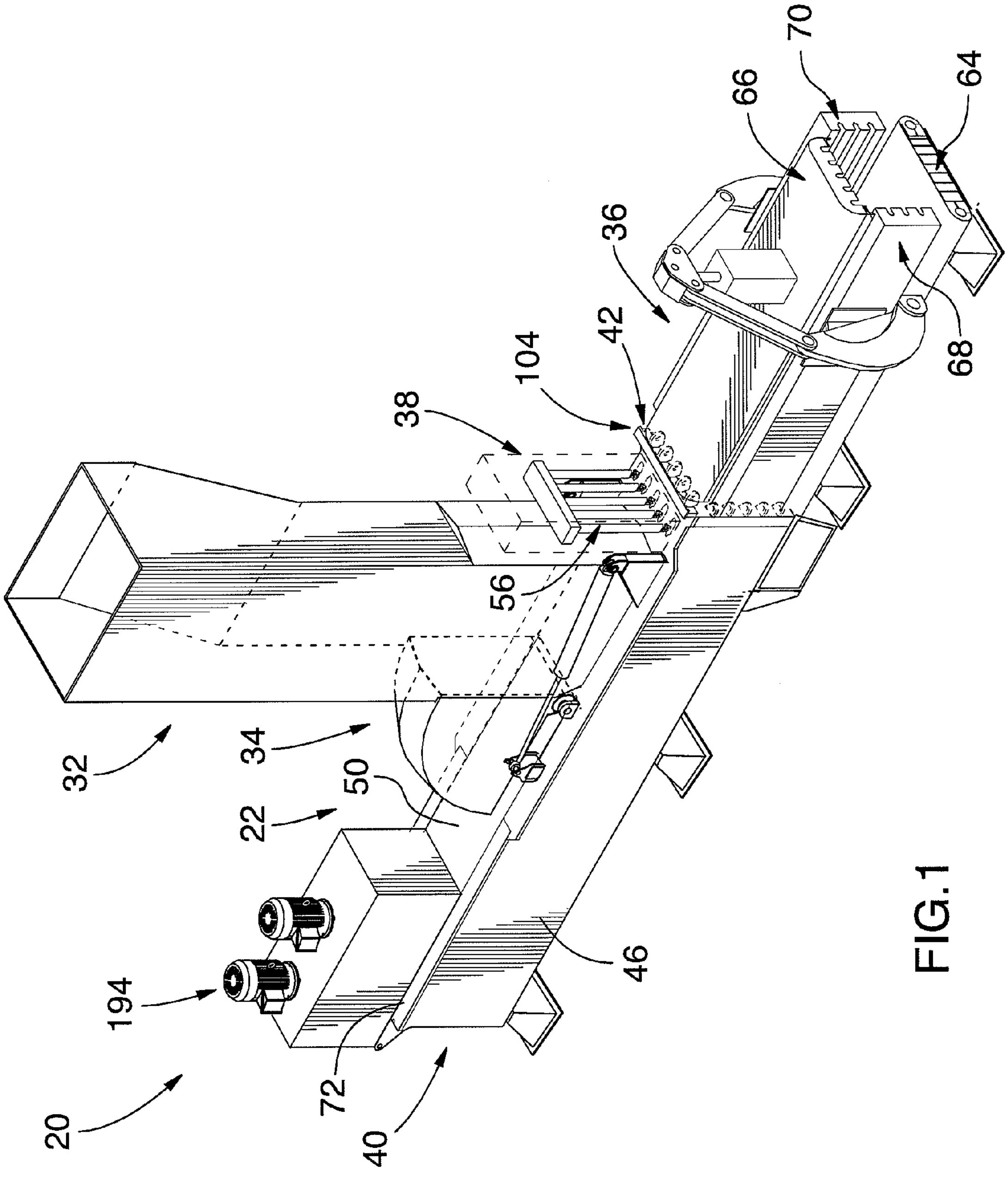
FIG. 1 is a front left perspective view of a single ram baler according to one embodiment of the present invention.

The description which follows, and the embodiments described therein are provided by way of illustration of an example, or examples of particular embodiments of principles and aspects of the present invention. These examples are provided for the purpose of explanation and not of limitation, of those principles of the invention. In the description that follows, like parts are marked throughout the specification and the drawings with the same respective reference numerals.

Figure 2:
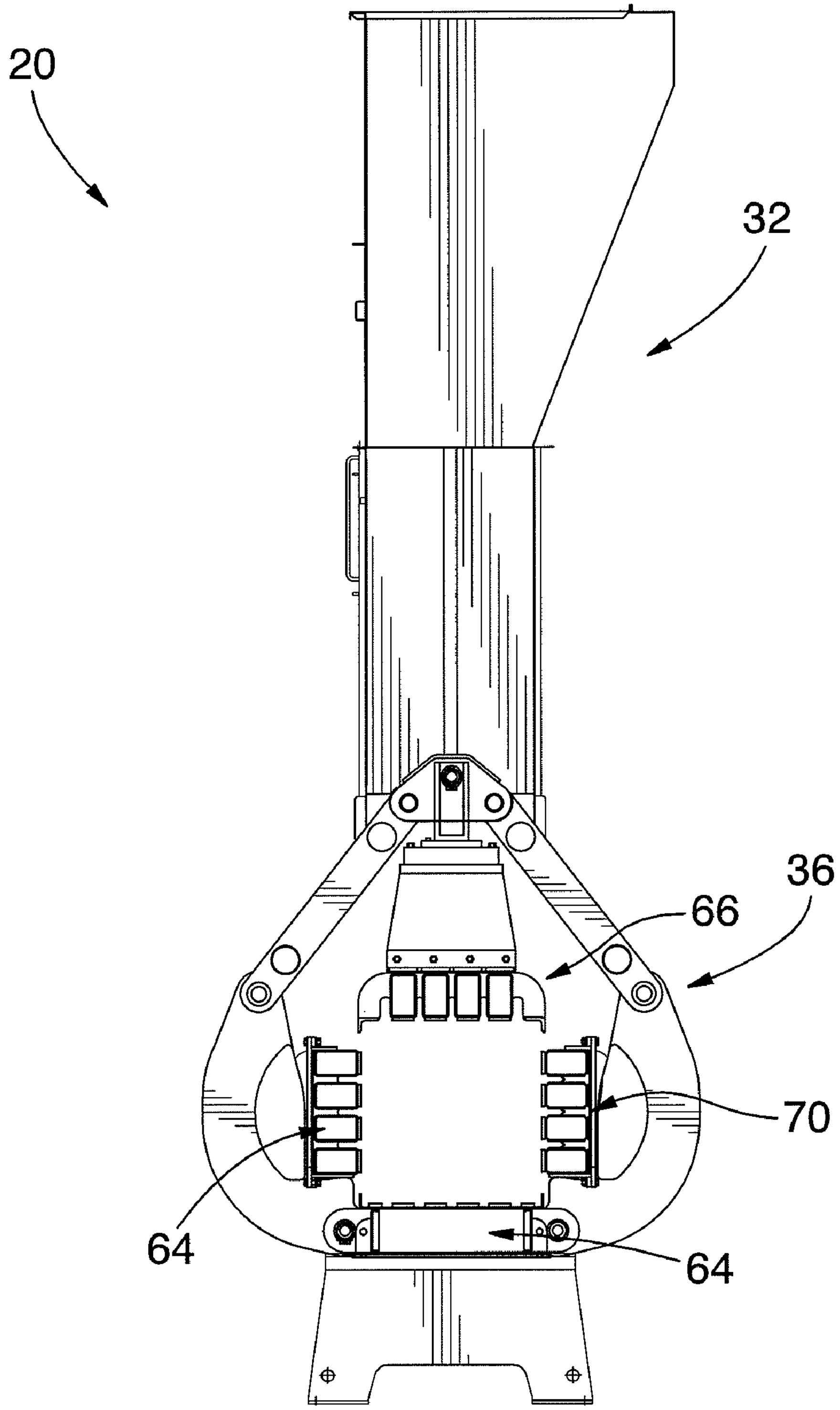
FIG. 2 is a front elevation view of the single ram baler shown in FIG. 1.
Figure 3:
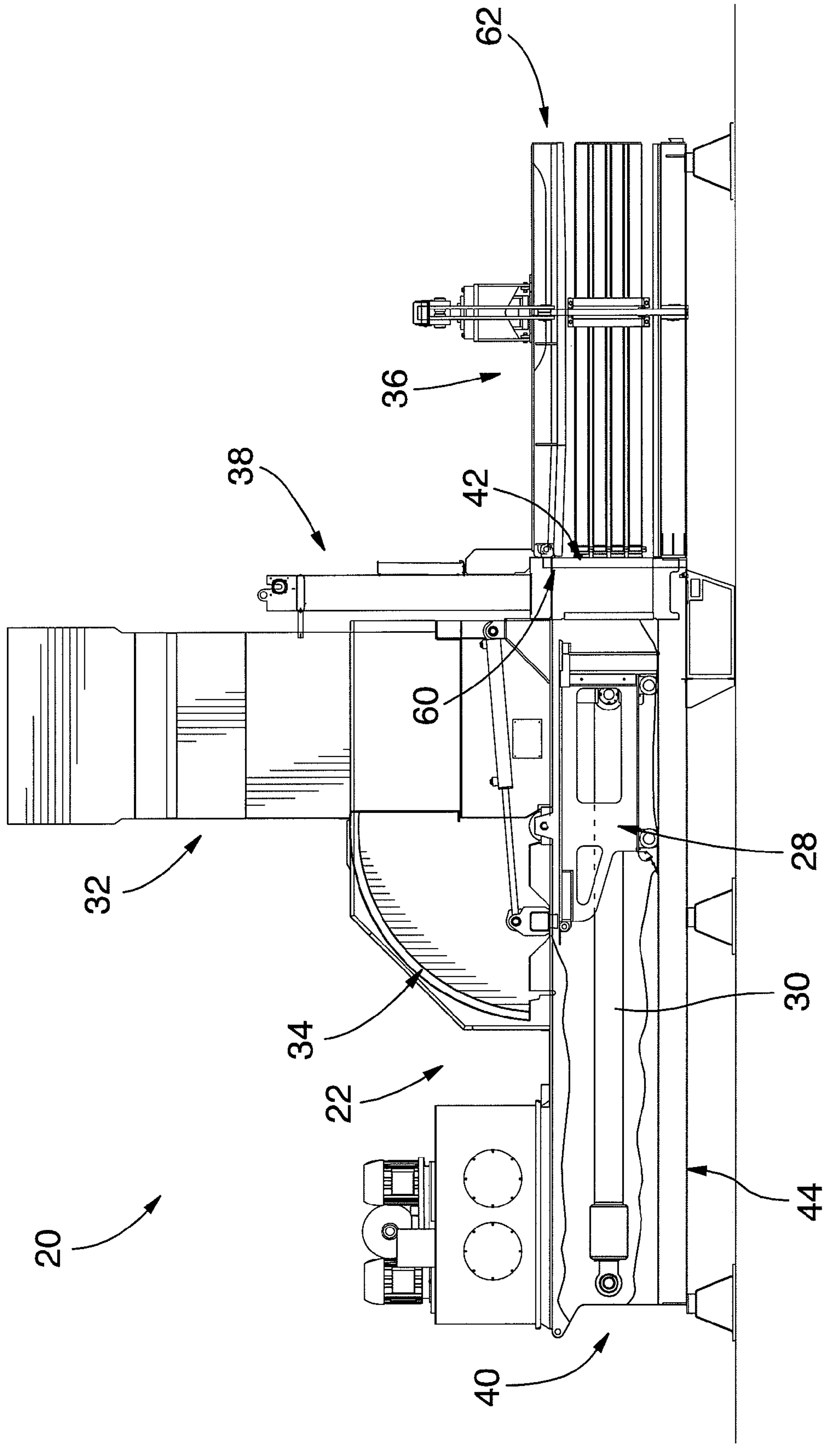
FIG. 3 is a left elevation view of the single ram baler shown in FIG. 1.
Figure 4:
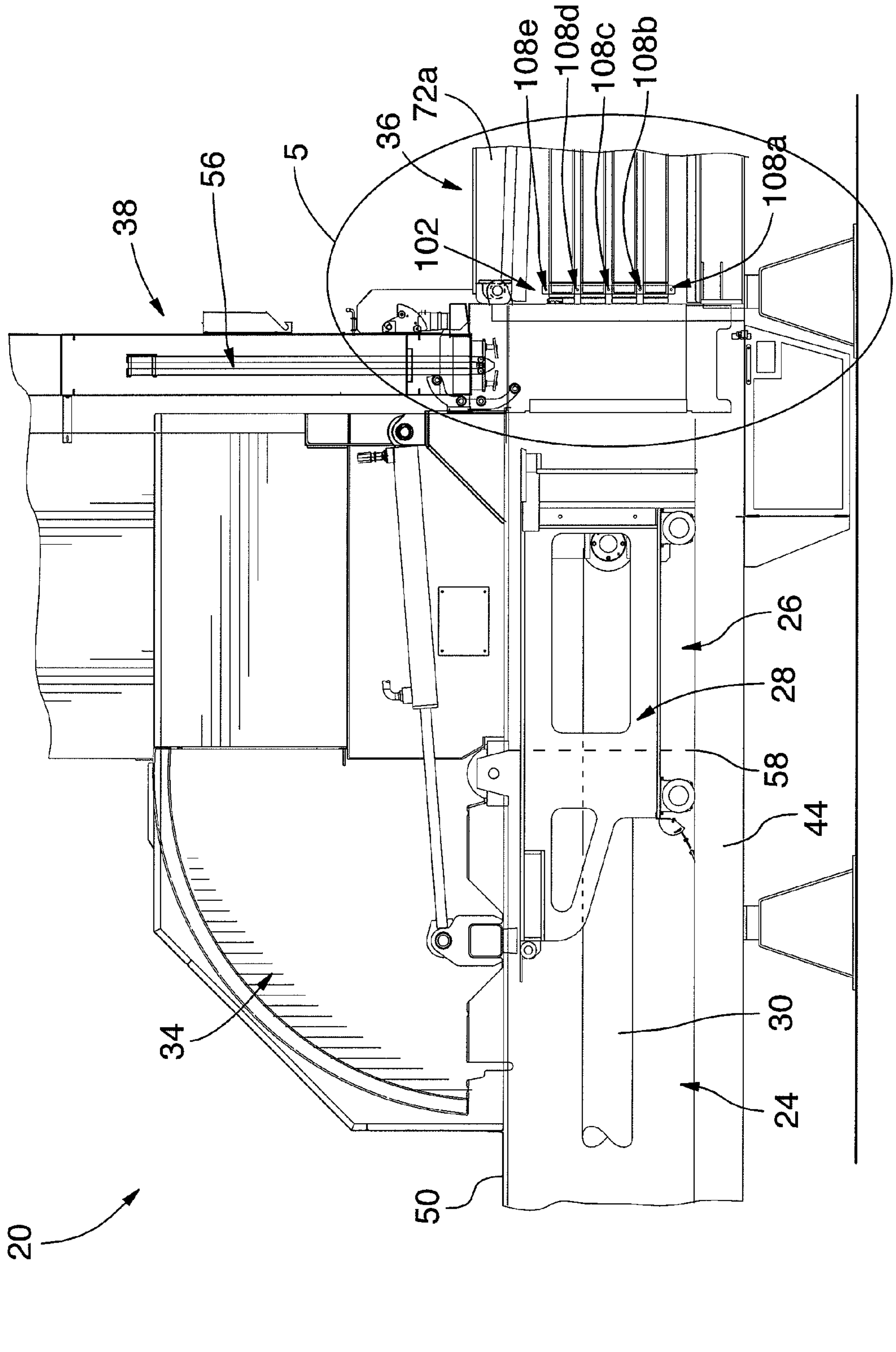
FIG. 4 is an enlarged left elevation view of the single ram baler shown in FIG. 3.

With reference to FIGS. 1 to 6 a single ram baler according to one embodiment of the present invention is shown using reference numeral 20. The baler 20 comprises a generally horizontal housing 22 defining an actuator chamber 24 and a downstream compaction chamber 26 (FIG. 4). Mounted for reciprocation in the housing 22 is a press ram 28 coupled to a ram actuator 30, the actuator 30 being operable for driving reciprocation of the press ram 28 in the compaction chamber 26, as it will become apparent below. Provided on the housing 22 is a generally vertical hopper or feeding assembly 32 adapted for conveying the material to be baled in the compaction chamber 26. In one embodiment, the baler 20 is further provided with a preflap assembly 34 mounted on the housing 22 and adapted to force material that may be contained in the feeding assembly 32 to move towards the compaction chamber 26 of the housing 22.

Downstream from the housing 22, the baler 20 is provided with a generally horizontal extrusion channel 36. The extrusion channel 36 is adapted for retaining bales of compacted recycled material, where bales retained in the extrusion channel provide a surface allowing the build up of further bales of material, as it will become apparent below. In one embodiment, a vertical wire-catch assembly 38 is provided for wiring the bales produced upon operation of the baler 20 (shown in FIGS. 1 and 4).

Figure 6:
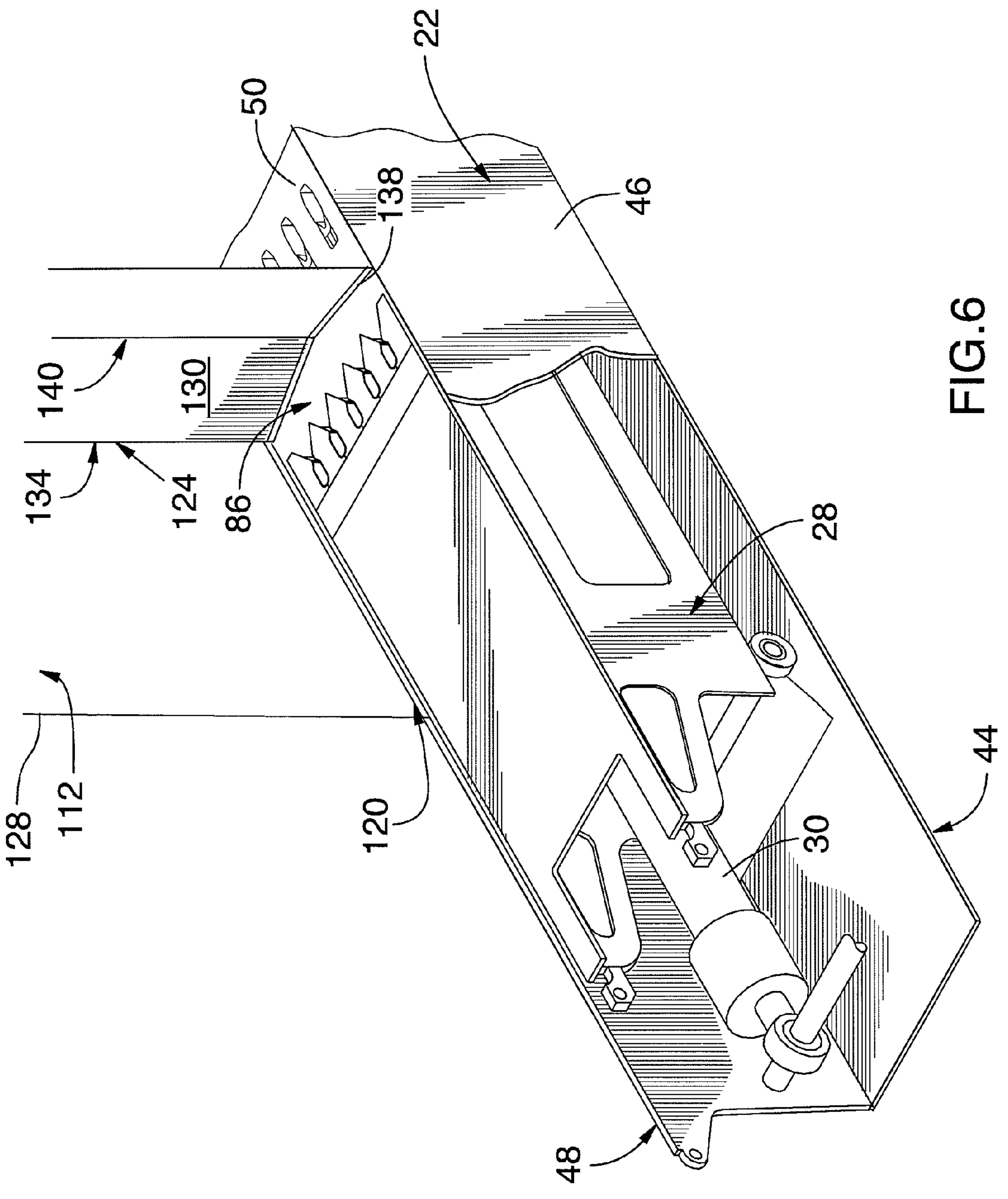
FIG. 6 is an enlarged, back left perspective view of the single ram baler shown in FIG. 1, with the housing and the feeding assembly partially cut out to show the ram.

The housing 22 has a back end 40, a front end 42 and comprises a generally horizontal base or bottom wall 44, a pair of space apart side walls 46, 48 extending upright on each side of the bottom wall 44 and a top wall 50 defining together a rectangular cross-section (shown in FIG. 6).

Figure 7:
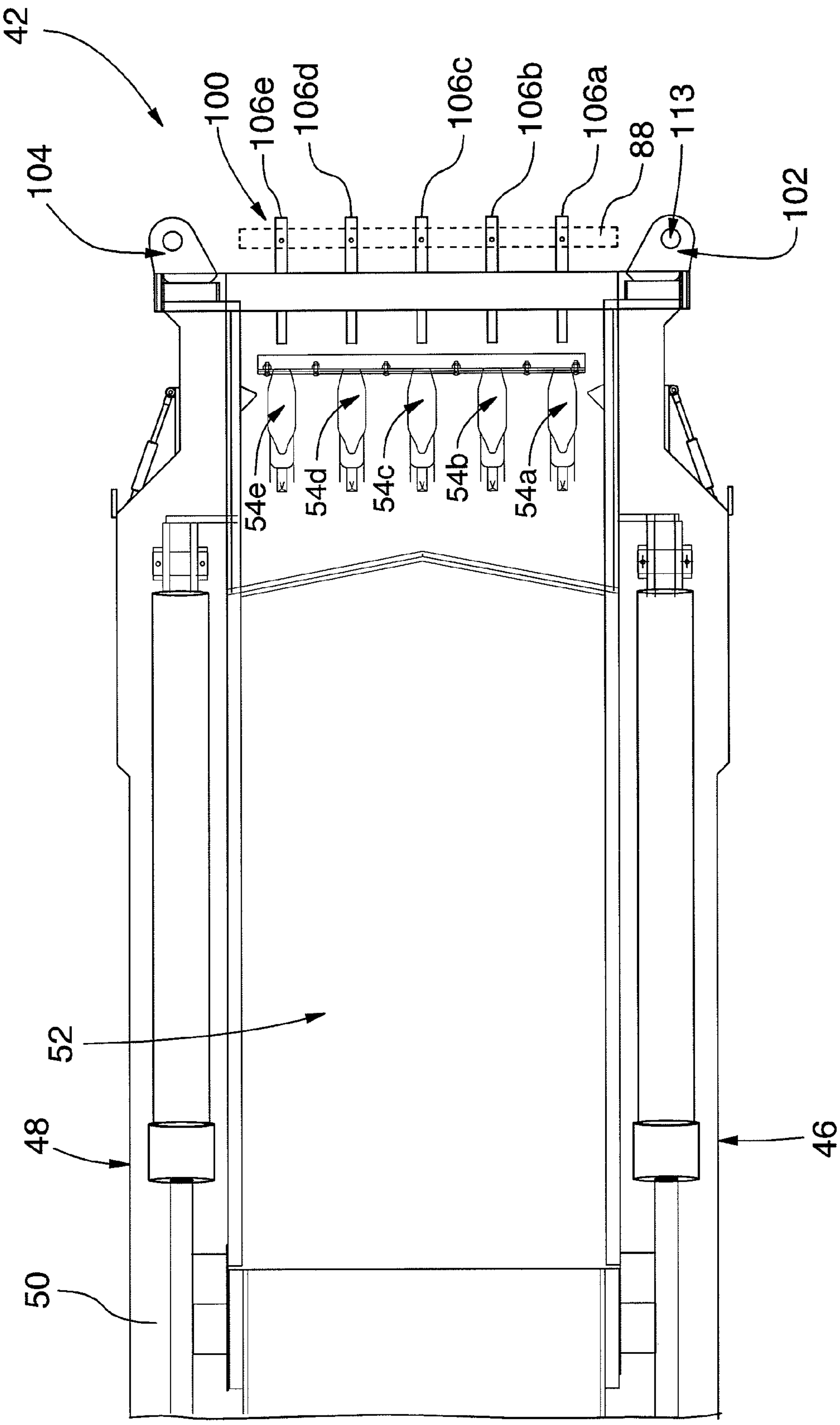
FIG. 7 is a partial top plan view of the single ram baler shown in FIG. 1.

Now turning to FIG. 7, a feeding opening 52 is defined on the top wall 50 of the housing 22. The feeding opening is adapted for allowing the passage of material therethrough, from the upstream feeding hopper 32 to the downstream compaction chamber 26. Also provided on the top wall 50 is a plurality of wire-catch holes 54*a*-54*e* located proximal to the front end 42. The wire-catch holes 54*a*-54*e* are preferably distributed evenly on the top wall 70 between the side walls 46, 48. The wire-catch holes 54*a*-54*e* are sized, shaped and positioned for receiving therein a corresponding plurality of needles 56 of the wire-catch assembly 38, as it will become apparent below.

Defined in the housing 22 and extending from the back end 40 to a first intermediate region 58 is the actuator chamber 24 adapted for receiving therein the hydraulic actuator 30 (FIG. 4). Downstream from the actuator chamber 24 is the compaction chamber 26, extending between the first intermediate region 58 to the front end 42 of the housing 22.

With reference to FIGS. 1 to 3, the extrusion channel 36 is mounted at the front end 42 of the housing 22 and comprises a back end 60 in connection with the housing 22 and a front end 62 from which the baled material exits the baler 20, as best described below. The extrusion channel 36 is provided with a fixed bottom wall 64, a spaced-apart, movable top wall 66 and a pair of spaced-apart, movable side walls 68, 70 extending between the back and front ends 60, 62.

Figure 8:
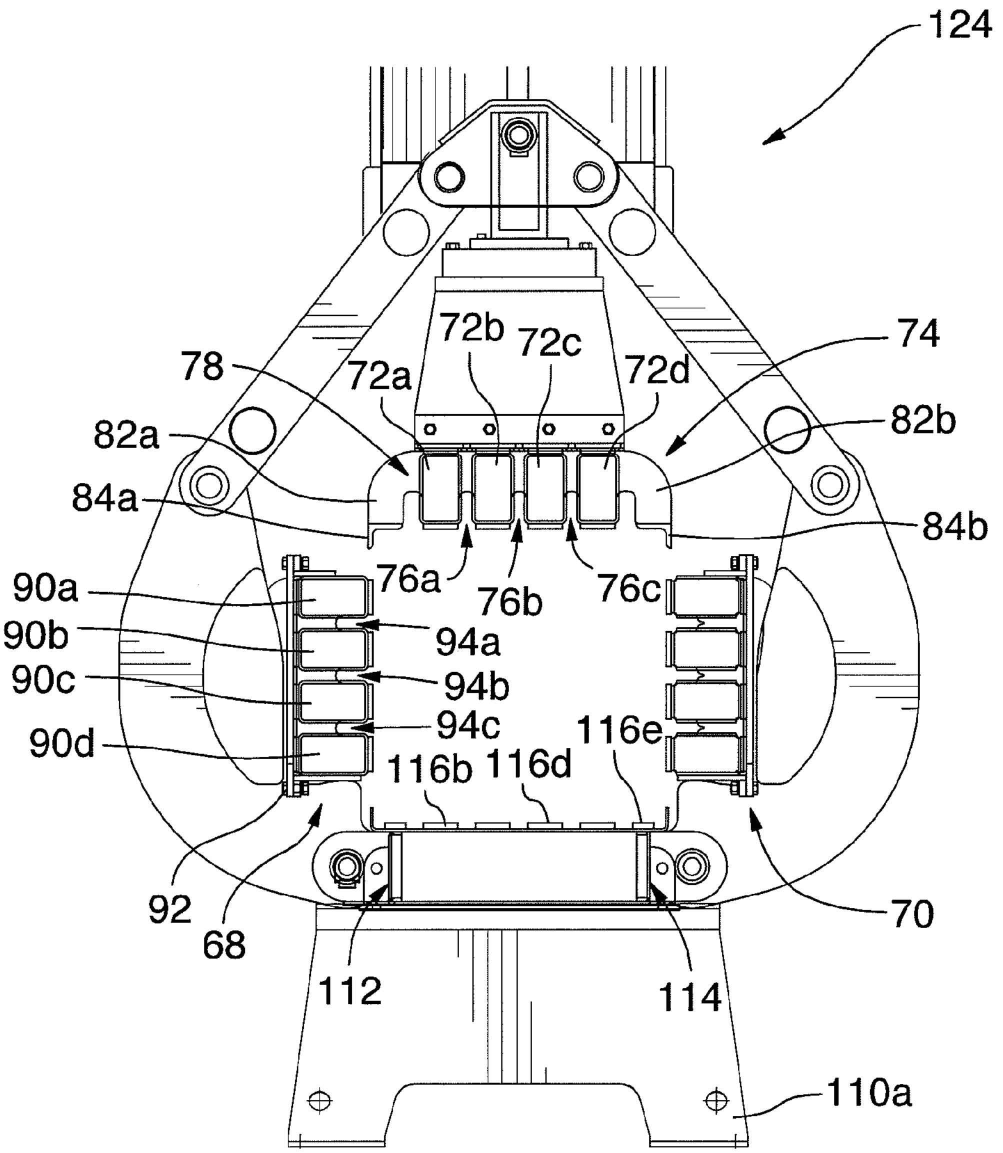
FIG. 8 is an enlarged front elevation view of the single ram baler shown in FIG. 1, showing the extrusion channel in open position.
Figure 9:
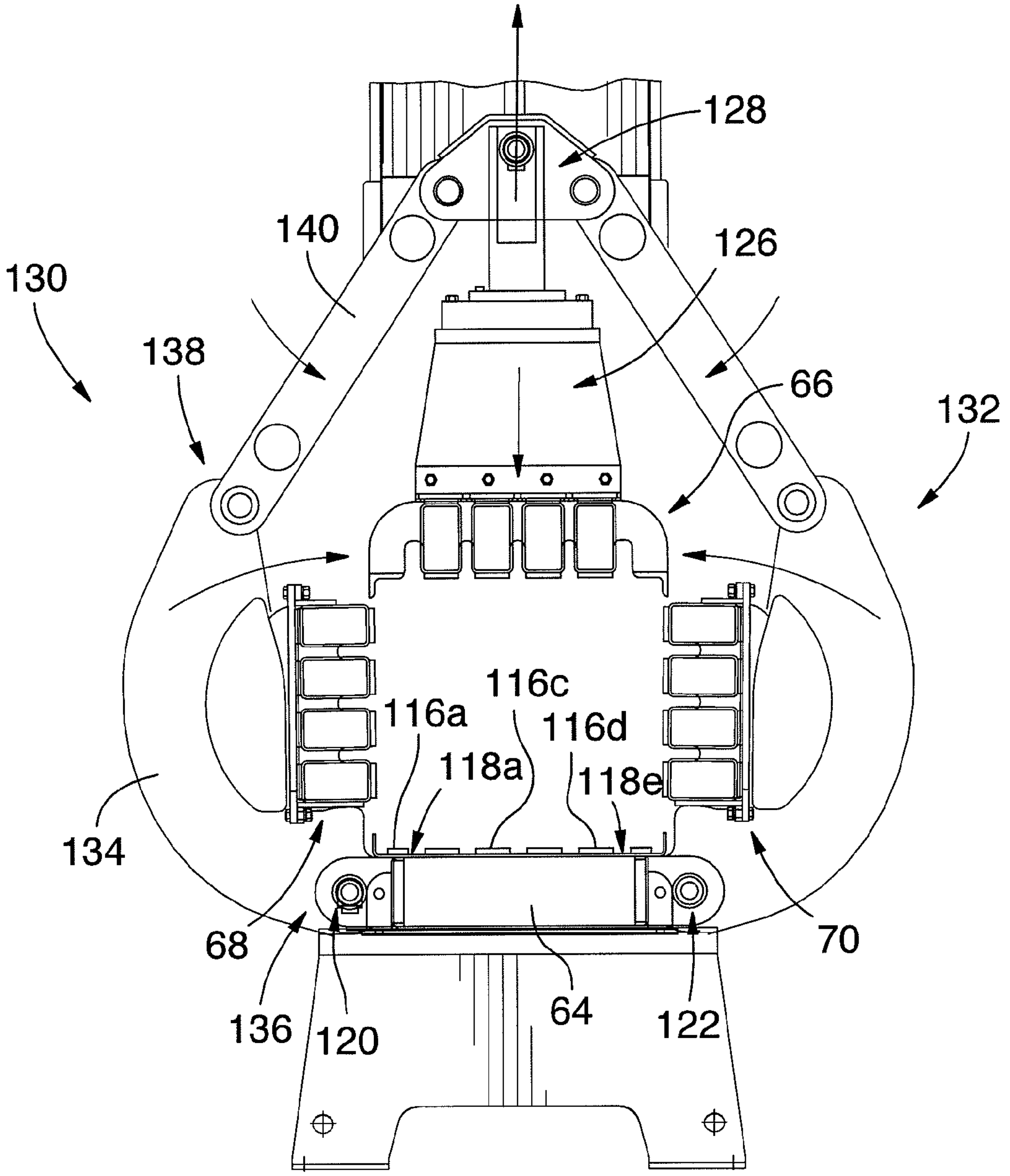
FIG. 9 is another enlarged elevation view of the single ram baler shown in FIG. 1, showing the extrusion channel in close position.

In this embodiment, the top wall 66 comprises four (4) elongated, rectangular cross-sectioned beams 72*a*-72*d* extending between the back end 60 and the front end 62 and connected to one another by a plurality of inverted U-shaped cross-members 74 (best shown in FIGS. 8 and 9). In one embodiment, the beams 72*a*-72*d* are parallel and spaced from one another so as to define spaces 76*a*-76*c* therebetween for receiving wires of the wiring assembly 38. As best shown in FIG. 8, the cross members 74 each comprises a generally horizontal portion 78 in connection with the beams 72*a*-72*d* and a pair of downwardly extending portions 82*a*, 82*b* extending on each side of the beam 72*a* and 72*d*. The top wall 66 is further provided with a pair of L-shaped beams 84*a*, 84*b*, each L-shaped beam 84*a*, 84*b* being mounted to one of downwardly extending portion 82*a*, 82*b* of the cross-members 74, and extending parallel to the main beams 72*a*-72*d*, between the back and front ends 60, 62 of the extrusion channel 36.

Figure 10:
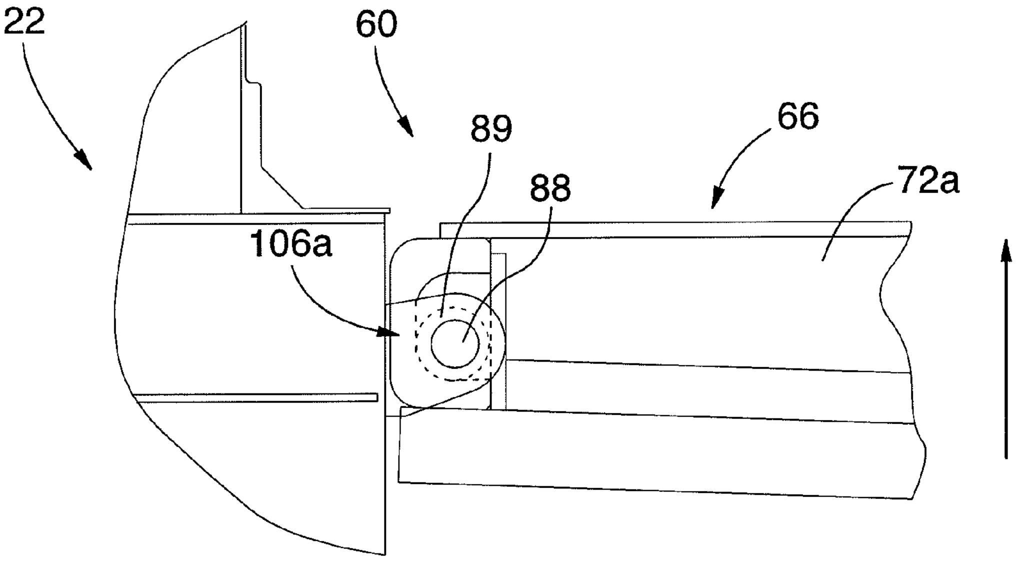
FIG. 10 is an enlarged side elevation view of the single ram baler shown in FIG. 1, showing the position of the elongated hole of the top wall in upper position.

At the back end 60, the top wall 66 is provided with a generally elongated hole 86 (e.g. an oblong or rectangular hole) extending horizontally through the beams 72*a*-72*d*. The elongated hole 86 is adapted for receiving therein a mounting rod 88 provided with rollers 89 rotatably mounted thereto for mounting the top wall 66 of the extrusion channel 36 to the top wall 50 of the housing 22, at the front end 42 thereof, as best described below (best shown in FIGS. 7, 10 and 11). A person skilled in the art will appreciate that the hole 86 may have a different shape.

The side walls 68, 70 being mirror images of one another, only side wall 68 will be described. A person skilled in the art will appreciate that a similar description also applies to side wall 70. With reference to FIG. 8, the side wall 68 comprises four (4) rectangular cross-sectioned beams 90*a*-90*d* extending between the back and front ends 60, 62 of the extrusion channel 36. The beams 90*a*-90*d* are distributed vertically and connected to one another by a plurality of cross-members 92. Similarly to beams 72*a*-72*d* of the top wall 66, the beams 90*a*-90*d* of the side wall 68 are spaced-apart from one another so as to define spaces 94*a*-94*c* therebetween. The spaces 94*a*-94*c* are adapted for receiving therein wires of a horizontal wiring assembly (not shown), where such a horizontal wiring assembly is used instead of, or in addition to, the vertical wiring assembly 38.

Similarly to the top wall 66, the side wall 68 is provided with a generally elongated hole (not shown) extending vertically through the beams 90*a*-90*d*. The elongated hole (not shown) is adapted for receiving therein a mounting rod provided with rollers rotatably mounted thereto (not shown) for mounting the side wall 68 of the extrusion channel 36 to the side wall 46 of the housing 22, as best described below. A person skilled in the art will thus appreciate that the side walls 68 and 70 are mounted to the housing 22 similarly to the top wall 66.

In one embodiment, the top and side walls 66-70 of the extrusion channel 36 are floating along their entire length. In other words, the top wall 66 can move vertically both at the back and front ends 60, 62 and the side walls can move horizontally toward or away from one another both at the back and front ends 60, 62 of the extrusion channel 36. This configuration enables the modification of the extrusion channel 36 cross-section both at the back end 60 and the front end 62 to provide enhanced control over the travel speed of the baled material through the extrusion channel 36, as it will become apparent below.

In this embodiment, the top and side walls 66-70 of the extrusion channel 36 are mounted to the housing 22 via top and side hinge assemblies 100, 102 and 104 extending from the front end 42 of the housing 22 (shown in FIG. 7). In this embodiment, the top hinge assembly 100 comprises a plurality of brackets 106*a*-106*e* extending from the top wall 50, at the front end 42. The brackets 106*a*-106*e* are horizontally aligned to one another and are distributed at the front end 42 of the housing 22 to be each located on one side of one beam 72*a*-72*d*. The brackets 106*a*-106*e* are adapted for receiving therethrough the mounting rod 88 for connecting the top wall 66 of the extrusion channel 36 to the top wall 50 of the housing. More specifically, the mounting rod 88 extends between the brackets 100*a* and 100*e*, through the elongated hole 86 and the other brackets 100*b*-100*d*, each roller 89 being located within the elongated hole 86 of one corresponding beam 72*a*-72*d*. The elongated hole 86 is adapted for allowing a vertical movement (i.e. upwardly and downwardly) of the top wall 66, at the back end 60 of the extrusion channel 36.

Figure 5:
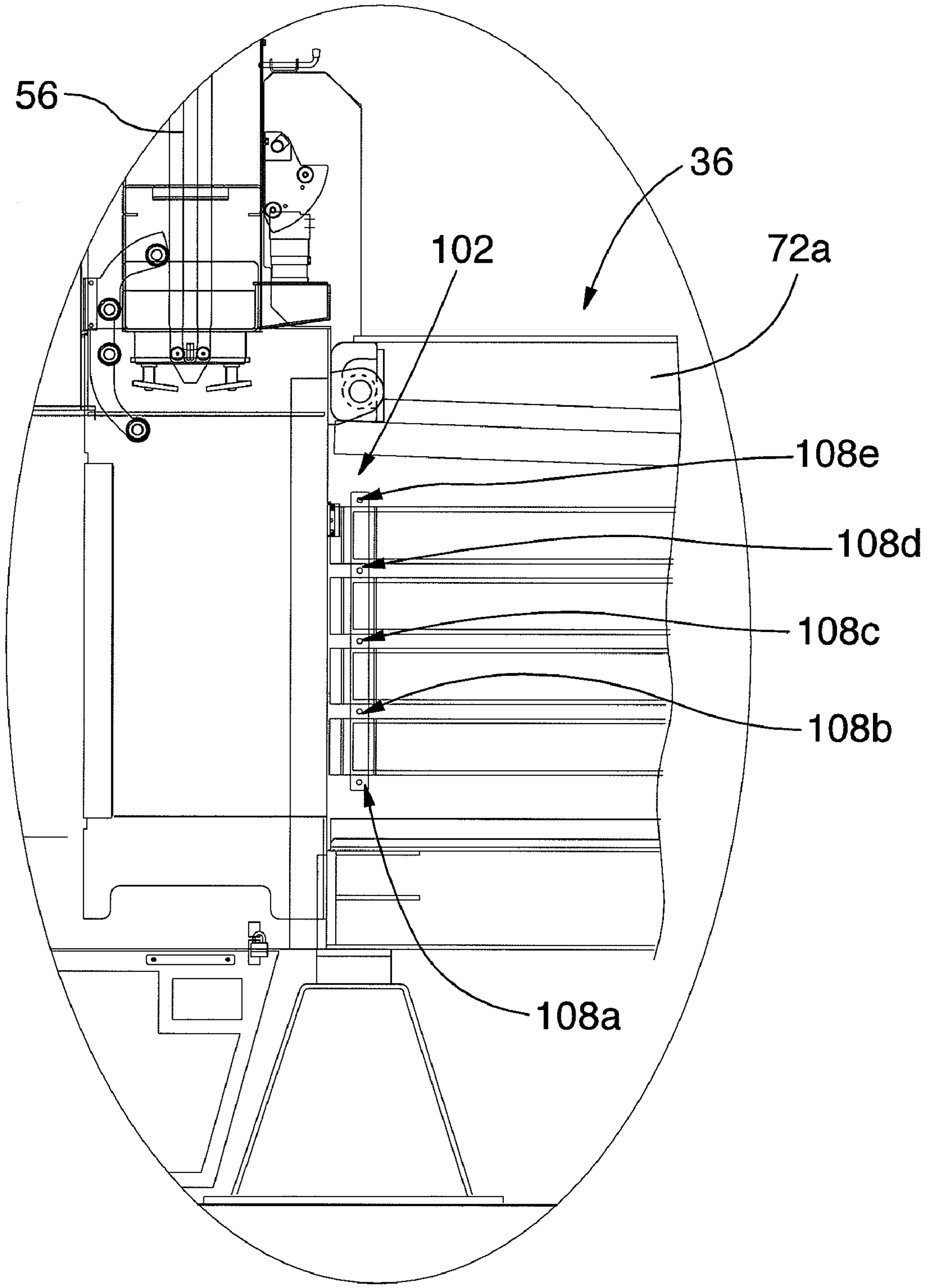
FIG. 5 is a further enlarged left elevation view of the single ram baler shown in FIG. 4, showing the mounting bracket of the housing.

The side hinge assembly 102 also comprises a plurality of brackets 108*a*-108*e* extending from the side wall 46 of the housing 22, at the front end 42 thereof (shown in FIG. 5). The brackets 108*a*-108*e* are vertically aligned onto one another and are positioned to be located on the top or bottom sides of one corresponding beam 90*a*-90*d*. The brackets 108*a*-108*e* are adapted for mounting the side wall 68 of the extrusion channel 36 to the side wall 46 of the housing. More specifically, the mounting rod (not shown) extends between the brackets 108*a* and 108*e*, through the elongated hole (not shown) of the side wall 68 and the other brackets 108*b*-108*d*, each roller (not shown) being located within the elongated hole of one corresponding beam 90*a*-90*d*. This configuration enables horizontal movement of the side wall 68 of the extrusion channel 36, at the back end 60, relative to the side wall 46 of the housing 22 (i.e. toward the inside and outside of the extrusion channel 36) as best shown in FIGS. 8 and 9).

The side hinge assembly 104 is configured similarly to side hinge assembly 102 and is adapted for mounting the side wall 70 of the extrusion channel 36 to the side wall 48 of the housing 22 while enabling horizontal movement thereof (i.e. toward the inside and outside of the extrusion channel 36).

Figure 11:
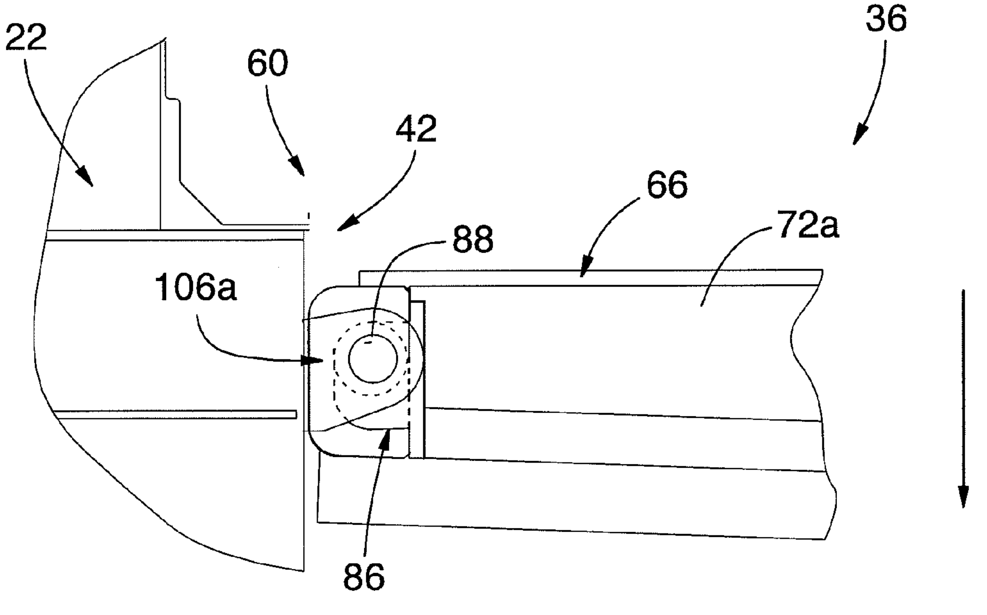
FIG. 11 is another enlarged side elevation of the single ram baler shown in FIG. 1, showing the position of the elongated hole of the top wall in lowered position.
Figure 12:
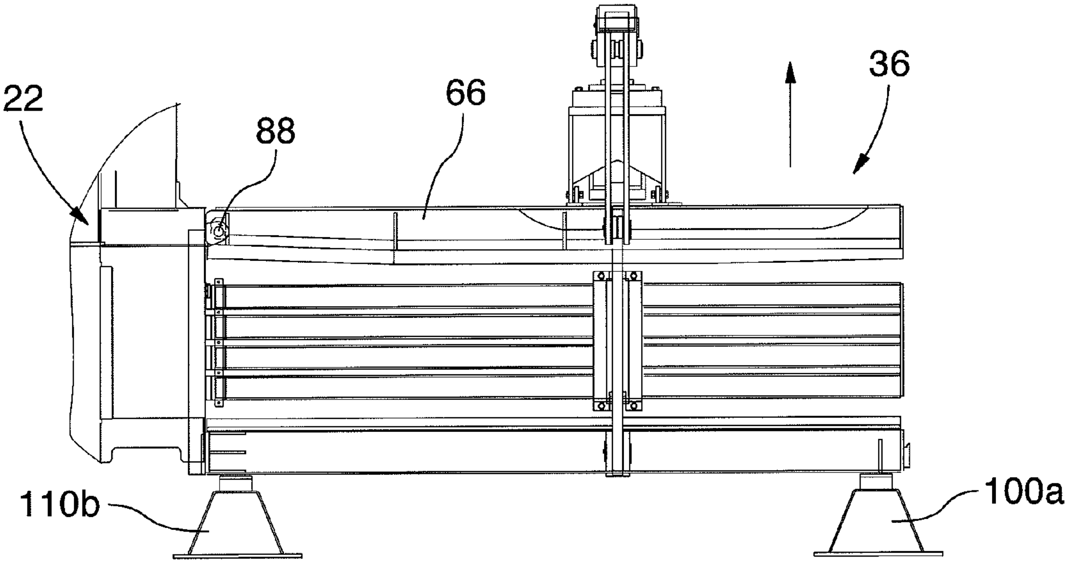
FIG. 12 is an enlarged side elevation view of the single ram baler shown in FIG. 1, showing the top wall of the extrusion channel in upper position.
Figure 13:
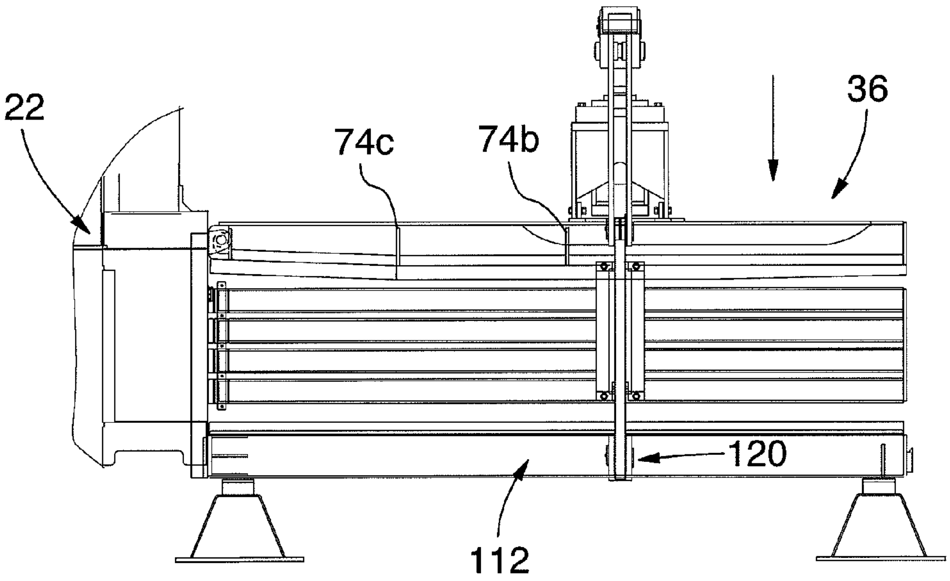
FIG. 13 is another enlarged side elevation of the single ram baler shown in FIG. 1, showing the top wall of the extrusion channel in lowered position.

As it will be appreciated by a person skilled in the art, the configuration of the elongated holes 86 together with the hinge assemblies 100-104 enables the top and side walls 66-70 to move relative to the corresponding rods 88 and 98, between an open position (shown in FIGS. 8, 10 and 12) and a close position (shown in FIGS. 9, 11 and 13). This enables the cross-section of the extrusion channel 36 to be modified at the back end 60, as well as to the front end 62.

In one embodiment, the bottom wall 64 lies on supports 100*a* and 100*b* (shown in FIG. 12) and is horizontally aligned with the bottom wall 44 of the housing 22. In this embodiment, the bottom wall 64 is fixedly mounted to the bottom wall 44 of the housing 22, extending between the back and front ends 60, 62, and is provided with first and second lateral faces 112 and 114. With reference to FIGS. 8 and 9, the bottom wall 64 is provided with a plurality of elongated, generally parallel strips 116*a*-116*f* of metal extending between the back and front ends 60, 62 of the extrusion channel 36. Between each pair of adjacent strips 116*a*-116*f* is defined a longitudinal space 118*a*-118*e* extending between the back end 60 and the front end 62 and configured for receiving therein wires of the wiring assembly 68.

Mounted to the side faces 112, 114 of the bottom wall 64, between the back end 60 and the front end 62, is a pair of pivot brackets 120, 122 for pivotably mounting a clamp assembly 124 to the bottom, top and side wall 64-70 (shown in FIGS. 8, 9 and 12). The clamp assembly 124 comprises a hydraulic cylinder 126 mounted on the top wall 66 of the extrusion channel 36 and operable for vertical movement. An actuator bracket 128 is provided on the actuator 126 for operatively connecting a pair of lever assemblies 130, 132, as best described below.

In one embodiment, the lever assembly 130 comprises a wall supporting member 134 having a bottom end 136 pivotably connected to the pivot brackets 120 of the bottom wall 64, and a top end 138. A connecting member 140 operatively connects the top end 138 of the supporting member 134 to the actuator bracket 128. The lever assembly 132 is very similar to the lever assembly 130, merely a mirror image thereof.

As it will be apparent for a person skilled in the art, when the hydraulic cylinder 126 is actuated or, in other words, when it moves from a retracted position (shown in FIG. 8) to an extended position (shown in FIG. 9), it forces the top wall 66 of the extrusion channel 36 to move toward the bottom wall 64 and causes the sides walls 68, 70 to move toward one another. Therefore, the actuation of the hydraulic cylinder 126 enables modulation of the cross-section of the extrusion channel 36. Further, due to the presence of the elongated holes 86, and the position of the clamp assembly 124 (i.e. between the back and front ends 60, 62), the cross-section of the extrusion channel 36 can be modified along its entire length or, in other words, is floating along its entire length, as best shown in FIGS. 12 and 13. This configuration of the clamp assembly 124 provides with enhanced control over the bale retention as multiple bales are formed and move towards the front end of the extrusion channel 36 compared to extrusion channels known in the art. Indeed, the extrusion channels of the prior art comprise top and side movable walls and more conventional hinge assemblies. The hinge assemblies of the prior art extrusion channels, along with clamp assemblies thereof, enable the walls to pivot about the hinge assembly for causing variation of the distance between the walls, at the outlet end only. As the cross-section is not substantially the same along the entire length of the prior art extrusions channels, it becomes difficult to reach a satisfactorily high bale density due to low friction factor, especially when baling plastic and other materials having low friction factors.

Having described the external components of the baler 20 (i.e. the housing 22, the feeding assembly 32 and the extrusion channel 36), the ram 28 mounted for reciprocation in the housing 22 will now be described with reference to FIGS. 14 to 18.

Figure 14:
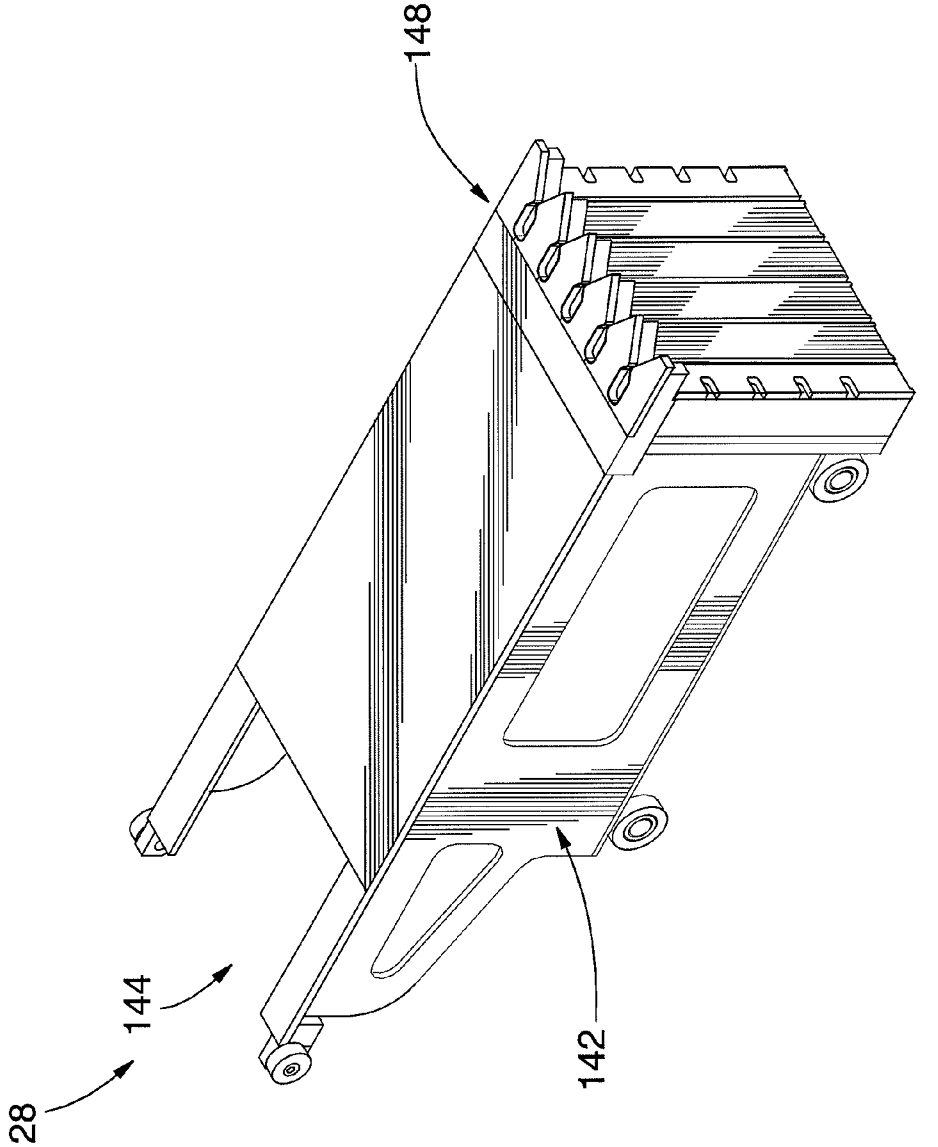
FIG. 14 is a front left perspective view of a ram according to one embodiment of the present invention.

The ram 28 comprises a frame 142 sized and shaped to be received in the housing 22. The frame 142 has a back end 144 directed toward the back end 40 of the housing 22 and a front end 146. Mounted to the front end 146 of the frame 142 is a generally vertical platen 148 (FIG. 14).

The platen 148 comprises a plate mounting block 150 extending vertically on the front end 146 of the frame 142, a blade mounting plate 152 mounted on the plate mounting block 150 and a plurality of cutting blades **154*a*-154*f* mounted to the blade mounting plate 152 (FIG. 15**) defining together a shear blade assembly.

Figure 16:
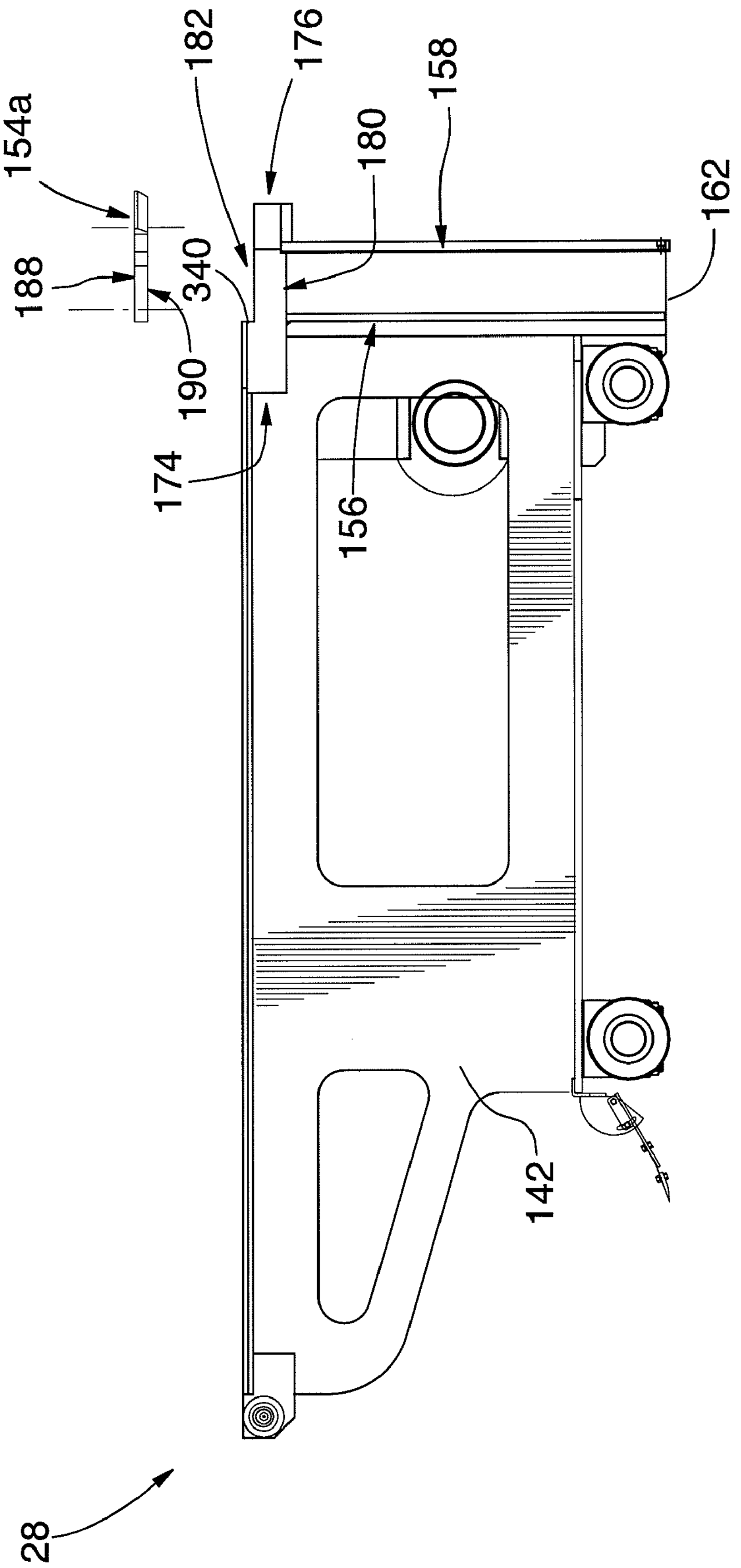
FIG. 16 is a left elevation view of the ram shown in FIG. 14.
Figure 17:
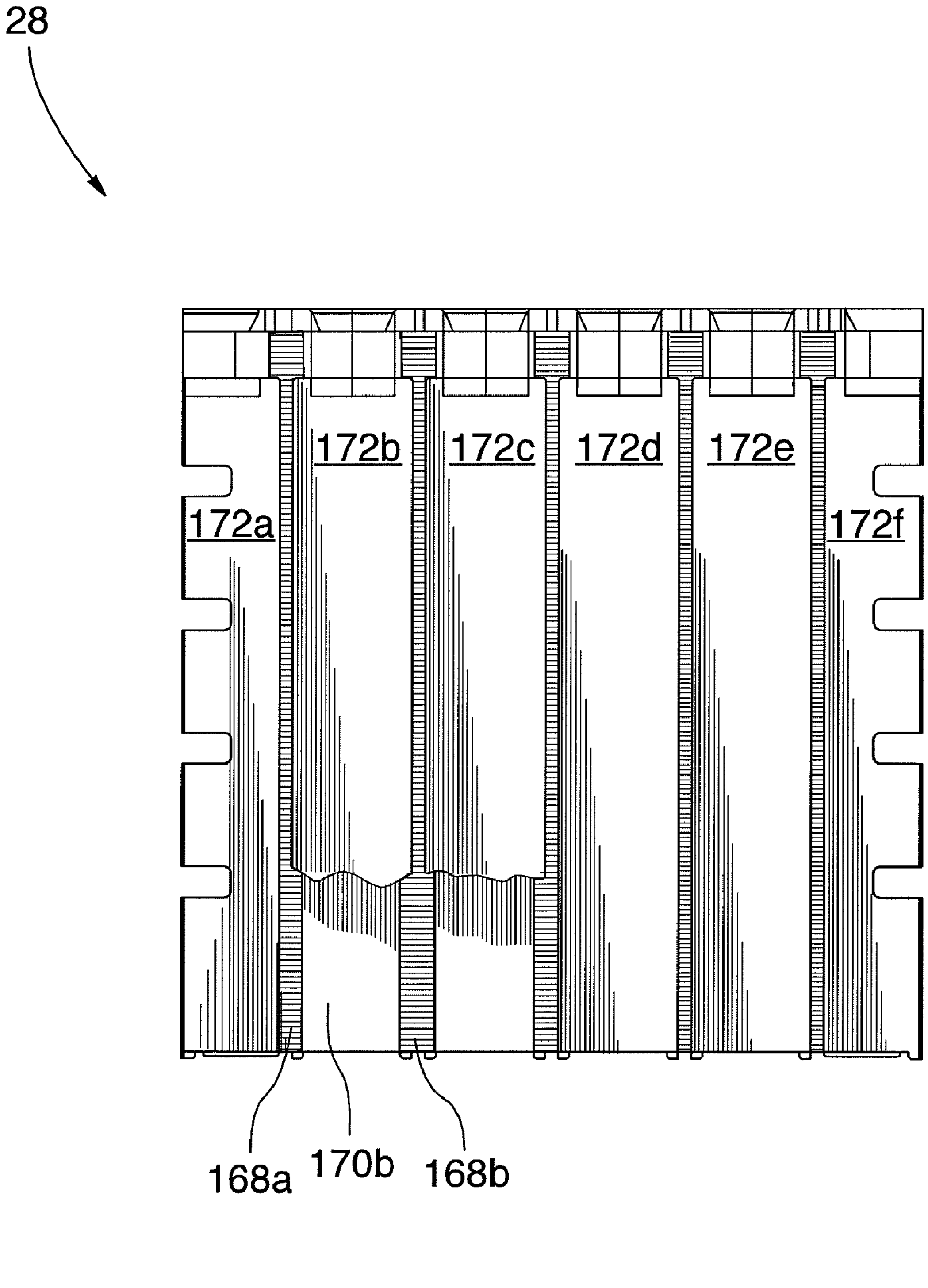
FIG. 17 is a front elevation view of the ram shown in FIG. 14, with a pair of push plates partially cut out for showing the grooves.

The plate mounting block 150 is generally a thick block of steel having a back face 156 welded or otherwise fastened to the frame 142, a front face 158, top and bottom faces 160, 162 and side faces 164, 166 (FIG. 16). In one embodiment of the present invention, the front face 158 comprises a plurality of vertical grooves **168*a*-168*e* extending from the top face 160 to the bottom face 162 (FIGS. 16 and 17). The grooves 168*a*-168*e* are sized and shaped for receiving therein the vertical needles 56 of the wire-catch assembly 38 during the operation of the baler 20 as it will become apparent below. Therefore, the front face 158 of the mounting block 150 defines somewhat of a crenellated surface comprising the grooves 168*a*-168*e* and a plurality of ridges 170*a*-170*f* on each sides of the grooves 168*a*-168*e***.

In one embodiment, a plurality of generally vertical push plates **172*a*-172*f* are mounted on the ridge 170*a*-170*f* of the mounting block 150 (FIG. 17). The push plates 172*a*-172*f*, are preferably made from steel, but any suitable material capable of sustaining the pressure forces of compaction process could be used. In one embodiment, the push plates 172*a*-172*f* are configured to partially overlap the grooves 168*a*-168*e*, as best shown in FIG. 17. This configuration is aimed at reducing the amount of recycled material entering the grooves 168*a*-168*e* during operation of the baler 20 while allowing the passage of a wire of the wire-catch assembly 38**.

The blade mounting plate 152 is fixedly mounted to the top face 160 of the mounting block 150. The blade mounting plate 152 is a generally horizontal thick plate of steel having a back end 174 adjacent to the frame 142, an opposed front end 176, a top face 178 and a bottom face 180. The mounting plate 152 defines a seat 182 for receiving the blades **154*a*-154*f*** therein.

Figure 15:
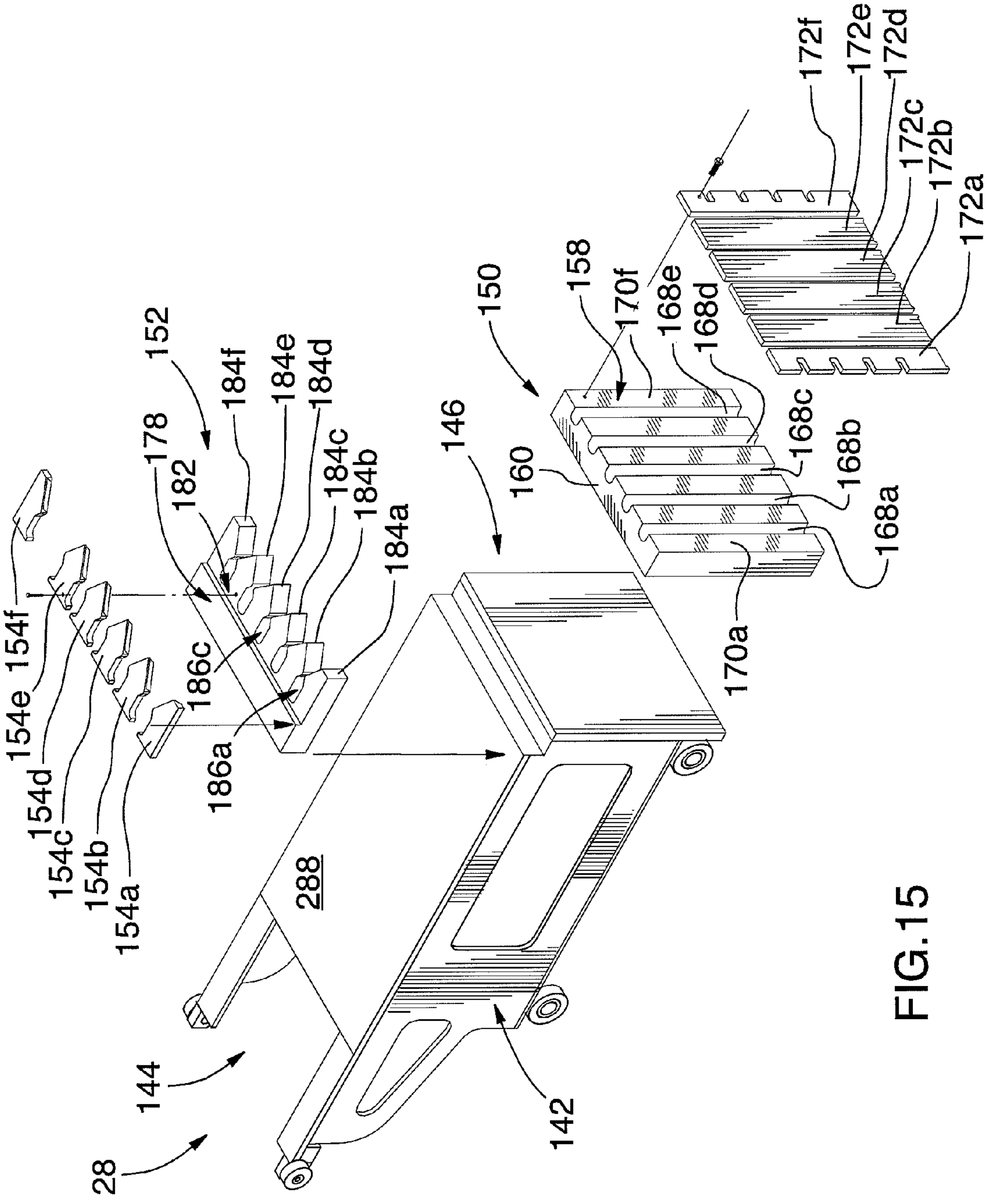
FIG. 15 is a front left perspective view of the ram shown in FIG. 14, with the platen partially exploded for clarity.

On the front end 176 thereof, the blade mounting plate 152 is provided with a plurality of teeth **184*a*-184*f*, horizontally distributed along the front end 176 and defining together somewhat of a zigzag configuration (FIG. 15). In one embodiment, the blade mounting plate 152** comprises between 1 and 20 teeth, and preferably between 3 and 10 teeth, and more preferably 6 teeth.

Between each pair of adjacent teeth (e.g. between teeth **184*b* and 184*c*), the blade mounting plate 152 is provided vertical wire-catch, receiving slots 186*a*-186*e*. Each slot 186*a*-186*e* extends vertically between the top and bottom faces 178, 180, backwardly from the front end 176 of the blade mounting plate 152. The wire-catch slots 186*a*-186*e* are shaped and sized for receiving therein the needle 56 of the wire-catch assembly 38 during operation of the baler 20 as best described below. As such, the slots 186*a*-186*e* have a width and depth similar to those of the vertical grooves 168*a*-168*e* of the mounting block 150, and are vertically aligned therewith when the blade mounting plate 152 is properly mounted on the block 150**.

Each blade **154*a*-154*f* is sized and shaped to match the size and shape of a corresponding tooth 184*a*-184*f* of the blade mounting plate 154, and comprises a top face 188 and a bottom face 190 (FIG. 16). Together, the teeth 154*a*-154*f* defines somewhat of a zigzag configuration once fastened on the blade mounting plate 152. In one embodiment, the teeth 154*a*-154*f* are mounted to the blade mounting plate 152 with fasteners such as bolts (not shown). A person skilled in the art will appreciate that the teeth 154*a*-154*f* could be fixedly mounted to the plate 152** such as, for instance, by welding.

Figure 18:
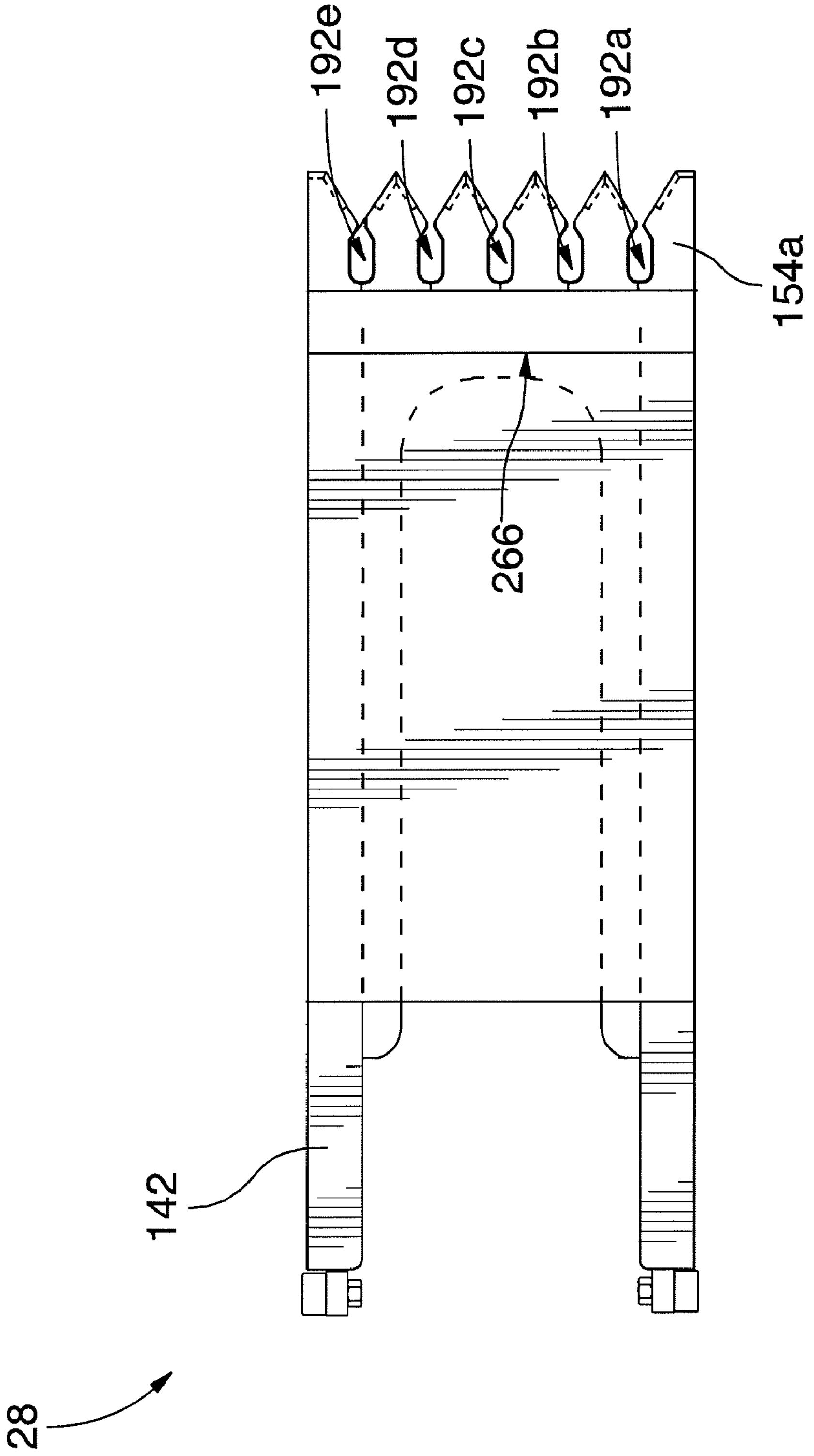
FIG. 18 is a top plan view of the ram shown in FIG. 14.

Defined between each pair of adjacent blades **154*a*-154*f* (when installed on the blade mounting plate 152) is a plurality of wire-catch receiving slots 192*a*-192*e* extending from the top face 188 and the bottom face 190 (FIG. 18). The wire-catch receiving slots 192*a*-192*e* are vertically aligned with the wire-catch receiving slots 186*a*-186*e* of the blade mounting plate 152 and the vertical grooves 168*a*-168*e* of the mounting block 150. As it will become apparent below, this configuration of the ram 28 enables the needles 56 of the wire-catch assembly 38 to move downwardly through the openings 54***a*-54*e* of the top wall 50 of the housing 22 and the mounting block 150 of the ram 28, toward a downward position (as shown in FIG. 22G) below the bottom face 162 thereof, to catch the bottom and the top wires before returning to an upward position (shown in FIGS. 22A to 22F) where such wires will be cut and twisted for maintaining the compacted material into a bale. The configuration of the wire-catch assembly 38 and its operation are known in the art and do not require exhaustive description. A person skilled in the art will however appreciate that the number of teeth 184*a*-184*f* and of wire-catch receiving slots 186*a*-186*e* and 192*a*-192*e* defined therebetween is adapted to correspond to the number of needles 56 of the wire-catch assembly 38.

For actuating reciprocation of the ram 28 inside the housing 22, the actuator 30 is provided. The actuator 30 has a back end 190 mounted to the side walls 46, 48 of the housing 22, proximal to the back end 40 thereof, and a front end 192 (shown in FIG. 19). The front end 192 of the hydraulic actuator 30 is mounted to the frame 142 of the ram 28.

Figure 19:
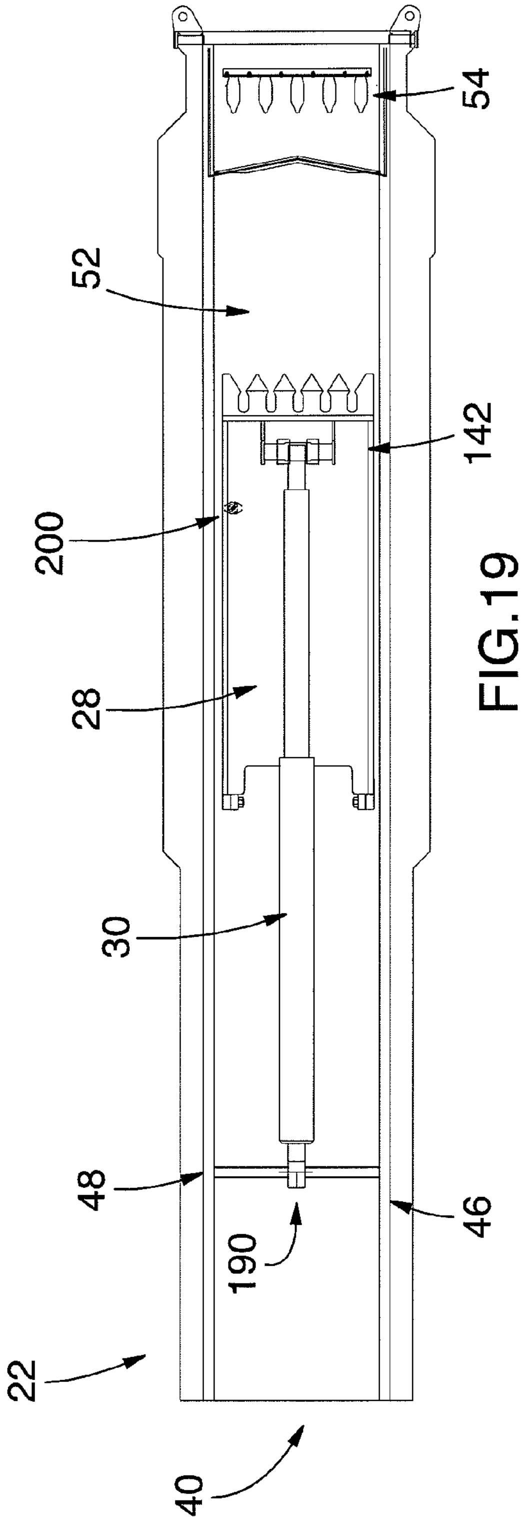
FIG. 19 is a top plan view of a single ram baler in accordance with one embodiment, with the top wall of the housing partially removed for showing the ram in retracted position.
Figure 20:
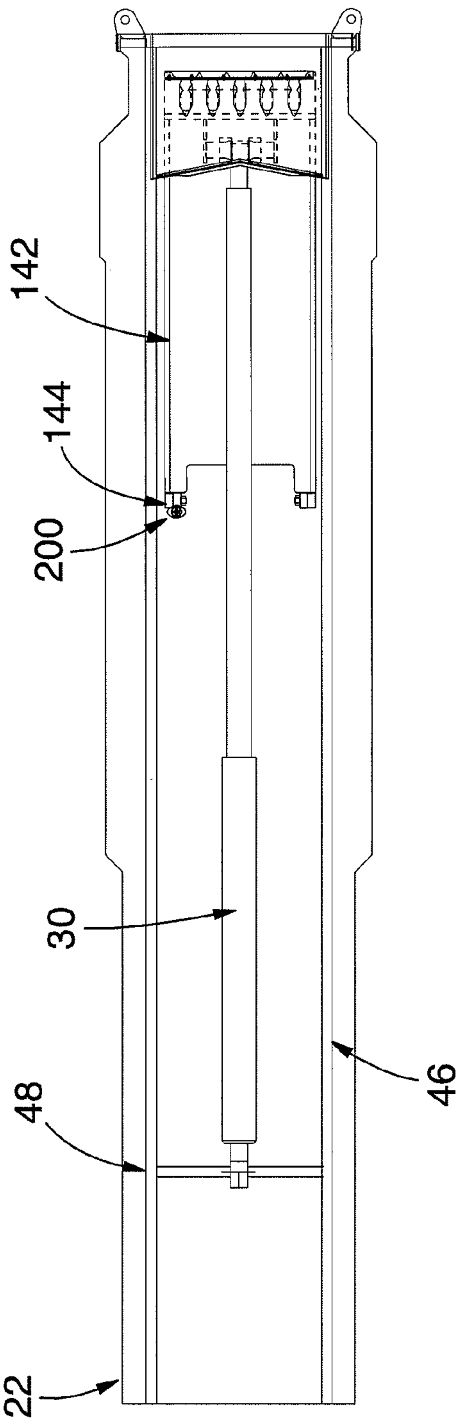
FIG. 20 is a top plan view of the single ram baler shown in FIG. 19, showing the ram in tying position.
Figure 21:
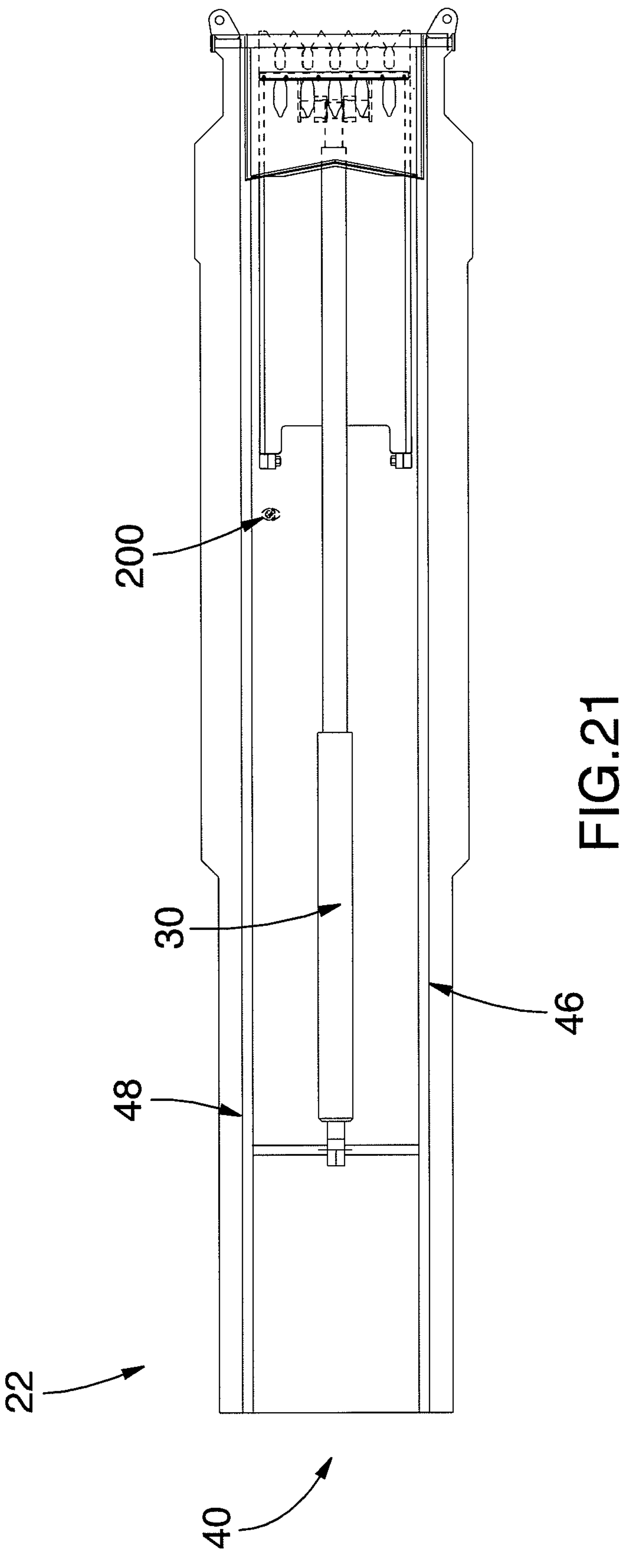
FIG. 21 is a top plan view of the single ram baler shown in FIG. 19, showing the ram in overstroke position.

Operatively connected to the hydraulic actuator 30 via hydraulic hoses is a hydraulic pump (not shown), driven by the electric motor 194 (shown in FIG. 1). The electric motor 194 and the hydraulic pump (not shown) control actuation of the hydraulic actuator 30 to move the ram 28 between a retracted position (as shown in FIG. 19), a tying position (shown in FIG. 20) and an overstroke position (shown in FIG. 21).

When in the retracted position (shown in FIG. 19) the ram 28 is proximal to the back end 40 of the housing 22, providing clearance for the recycled material to enter the compaction chamber 26 from the feeding assembly 32, via the opening 52. As the actuator 30 is set in motion, the ram 28 moves frontwardly, toward the tying position (shown in FIG. 20).

In tying position, the grooves 168*a*-168*e* of the mounting block 150 and the wire-catch slots 186*a*-186*e* and 192*a*-192*e* of the blade mounting plate 152 and the blades 154*a*-154*f* are vertically aligned with the wire-catch holes 54*a*-54*e* of the top wall 50 of the housing 22. In this tying position, the needles 56 of the wire-catch assembly 38 can be operated to move downwardly, through the holes 54*a*-54*e*, the slots 186*a*-186*e* and 192*a*-192*e* and the grooves 168*a*-168*e*, to catch wires below the bottom face 162 of the mounting block 150 and to move upwardly, back to the upward position (shown in FIGS. 22A-22I) for twisting the wires.

In overstroke position (shown in FIG. 21), the ram 28 is moved further frontwardly, toward the front end 42 of the housing 22. In this overstroke position, the grooves 168*a*-168*e* of the mounting block 150 and the wire-catch slots 186*a*-186*e* and 192*a*-192*e* of the blade mounting plate 152 and the blades 154*a*-154*f* are located beyond the wire-catch holes 54*a*-54*e* of the top wall 50 of the housing 22. In one embodiment, the grooves 168*a*-168*e* and the wire-catch slots 186*a*-186*e* and 192*a*-192*e* are located between 1 and 10 inches in front of the wire-catch holes 54*a*-54*e* , and preferably between 3 to 8 inches, and more preferably between 5 and 6 inches beyond the wire-catch holes 54*a*-54*e* when the ram 28 is in overstroke position. In one embodiment, the length of overstroke is adjustable to ensure sufficient expansion of the bales depending on the nature of the baled material. For instance, some materials may require a maximum overstroke (e.g. plastics), others may require no overstroke or minimum overstroke (e.g. paper, steel) while other may require an intermediate overstroke (i.e. between no overstroke and maximum overstroke.)

A person skilled in the art will appreciate that the hydraulic actuator 30 could be substituted by any other mechanical or pneumatic actuation or reciprocation mean allowing reciprocation of the platen between the retracted, tying and overstroke positions. The hydraulic actuator 30 could be replaced, for instance, by an actuator driven by endless screw, rack and pinion, chain and sprocket, belt and sprocket cable and pulley or cam mechanisms. A person skilled in the art will appreciate that the actuator mechanism, strength and power thereof can be adapted according to the amount of material to be compacted, as well as the size and density of the bales to be provided. In one embodiment, the actuator 30 has a capacity ranging from 10 to 500 metric tons, and preferably between 50 and 300 metric tons, and even more preferably between 100 and 200 metric tons.

Due to the high compaction force exerted by the ram 28 over the recycled material, and the high corollary force exerted by the compacted material over the ram 28 in tying position, the actuator 30 may have a tendency to slightly retract during operation of the baler 20. In other words, the pressure exerted by the compacted material over the ram 28 may cause the actuator 30 to slightly retract toward the retracted position. In this situation, the slots 186*a*-186*e* and 192*a*-192*e* and the grooves 168*a*-168 of the ram 28 may tend to be misaligned with the wire-catch holes 54*a*-54*e* of the top wall 50 and the needles 56, therefore impairing the use of the wire-catch assembly 38. Such a misalignment of the slots 186*a*-186*e* and 192*a*-192*e* with the wire-catch holes 54*a*-54*e* is also susceptible to occur in case of power outage, as the hydraulic actuator 30 may tend to retract.

Therefore, in one embodiment, the baler 20 may further provided with a lock mechanism 200 for locking the ram 28 into the tying position (shown in FIGS. 19 to 22I). The locking mechanism 200 comprises a hydraulic actuator 201 mounted on the top wall 50 of the housing 22 and adapted for extending inside the housing 22 through a hole (not shown). More specifically, the hydraulic actuator 201 comprises a piston 203 movable between a retracted position (shown in FIGS. 22A to 22D) and an extended position (shown in FIGS. 22E to 22G). Mounted at one end of the piston 203 is a lock pin 205. When the piston 203 is in retracted position, the bottom end of the pin 205 is aligned flush with the top wall 50, therefore allowing the ram 28 to freely travel back and forth in the housing 22. However, when the piston 203 is in extended position, the lock pin 205 protrudes from the top wall 50, inside the compaction chamber 26. As shown in FIGS. 20 and 22E to 22G, the lock mechanism 200 is positioned such that the back end 144 of the frame member 142 of the ram 28 will lie against the pin 205 in extended position, thereby preventing backward movement of the ram 28 in the housing 22.

Having generally described the baler 20, its operation will now be described in accordance with one embodiment of the present invention, referring to FIGS. 22A to 22I. In this embodiment, the baler 20 is used to bale recycled material having relatively high expansion coefficient, such as, for instance, plastic recipients.

Figure 22A:
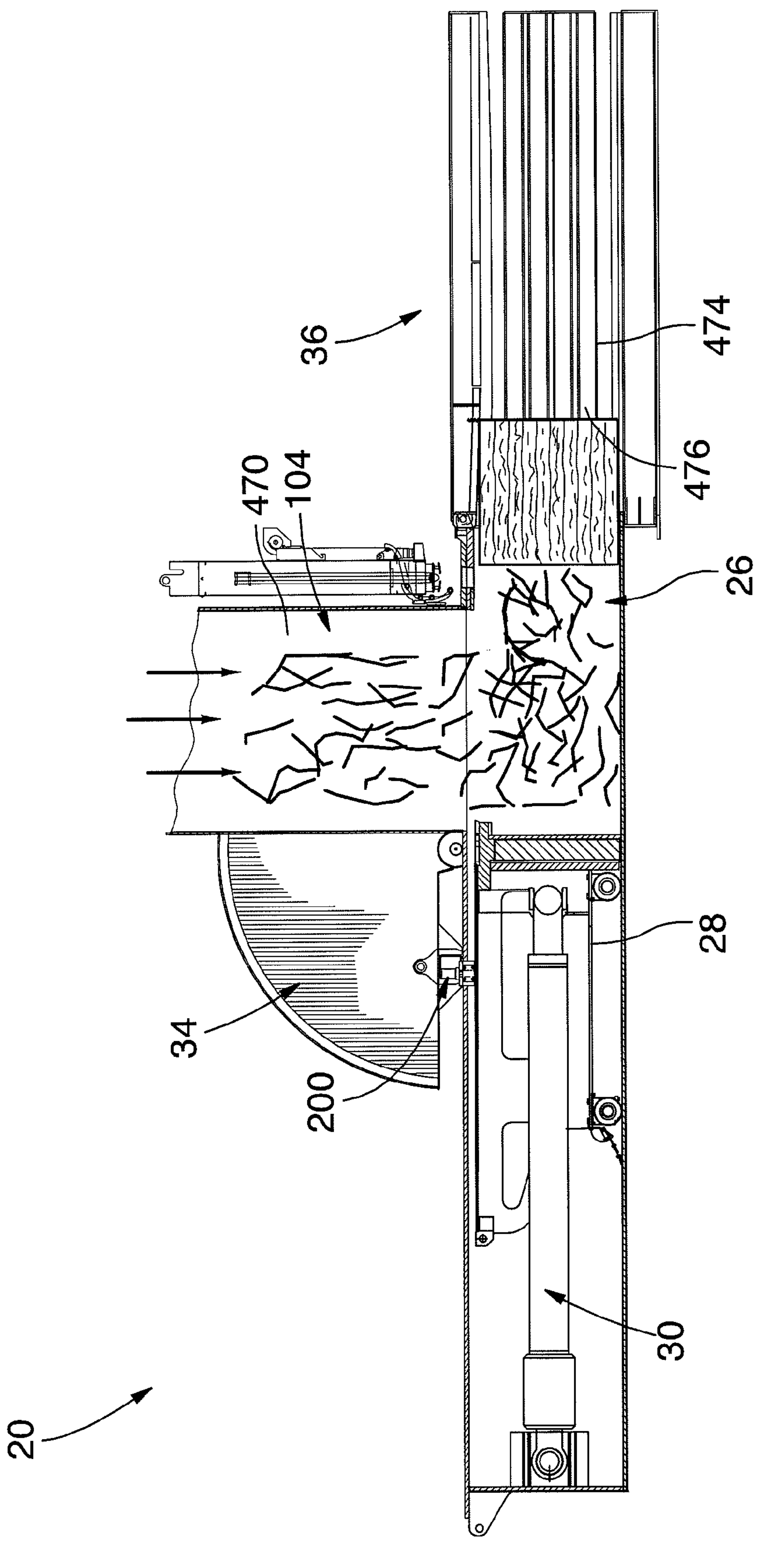
FIGS. 22A-22I are cross-section views of a single ram baler in accordance with one embodiment of the present invention, showing the operation thereof.
Figure 22B:
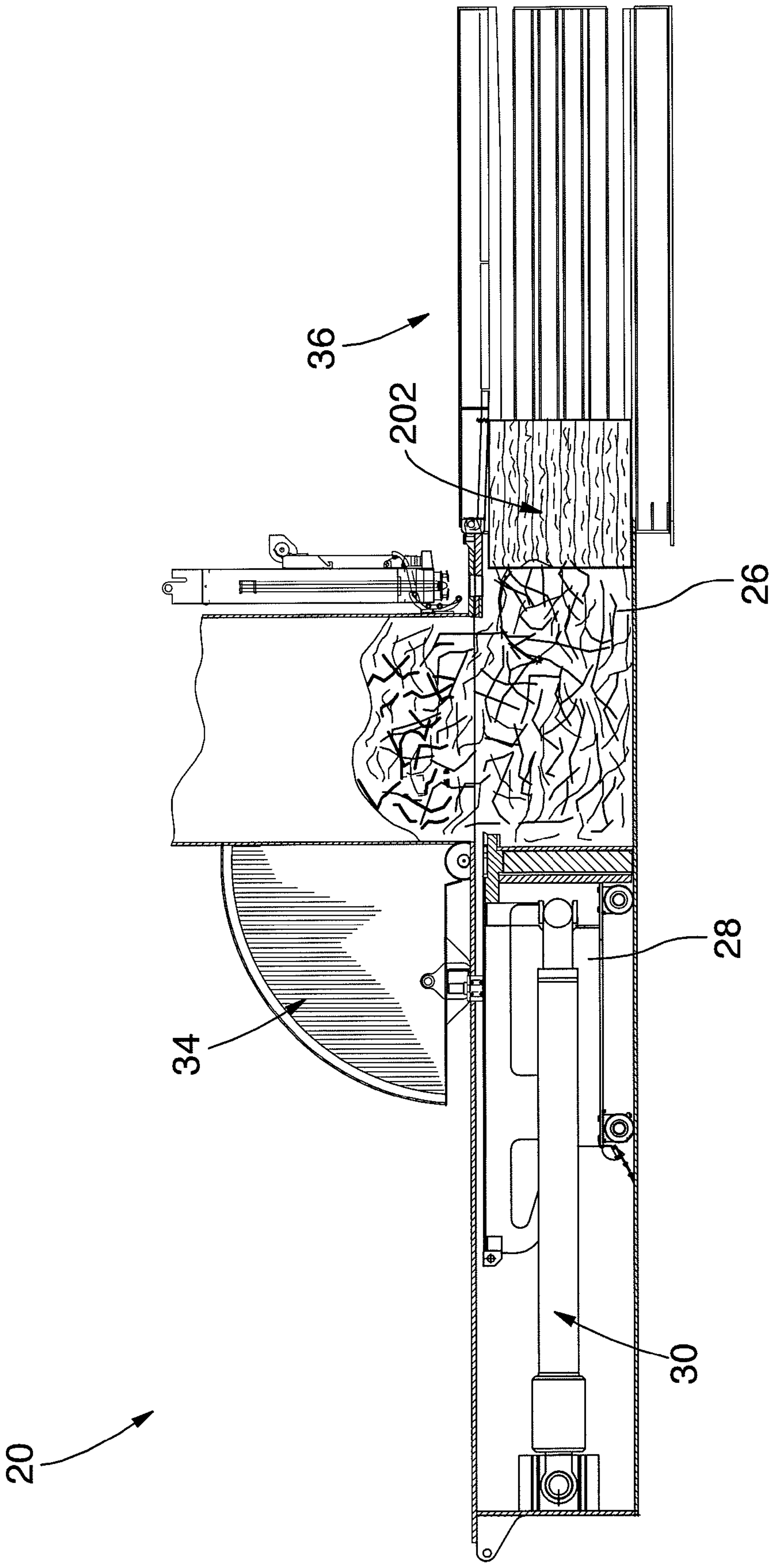
Figure 22C:
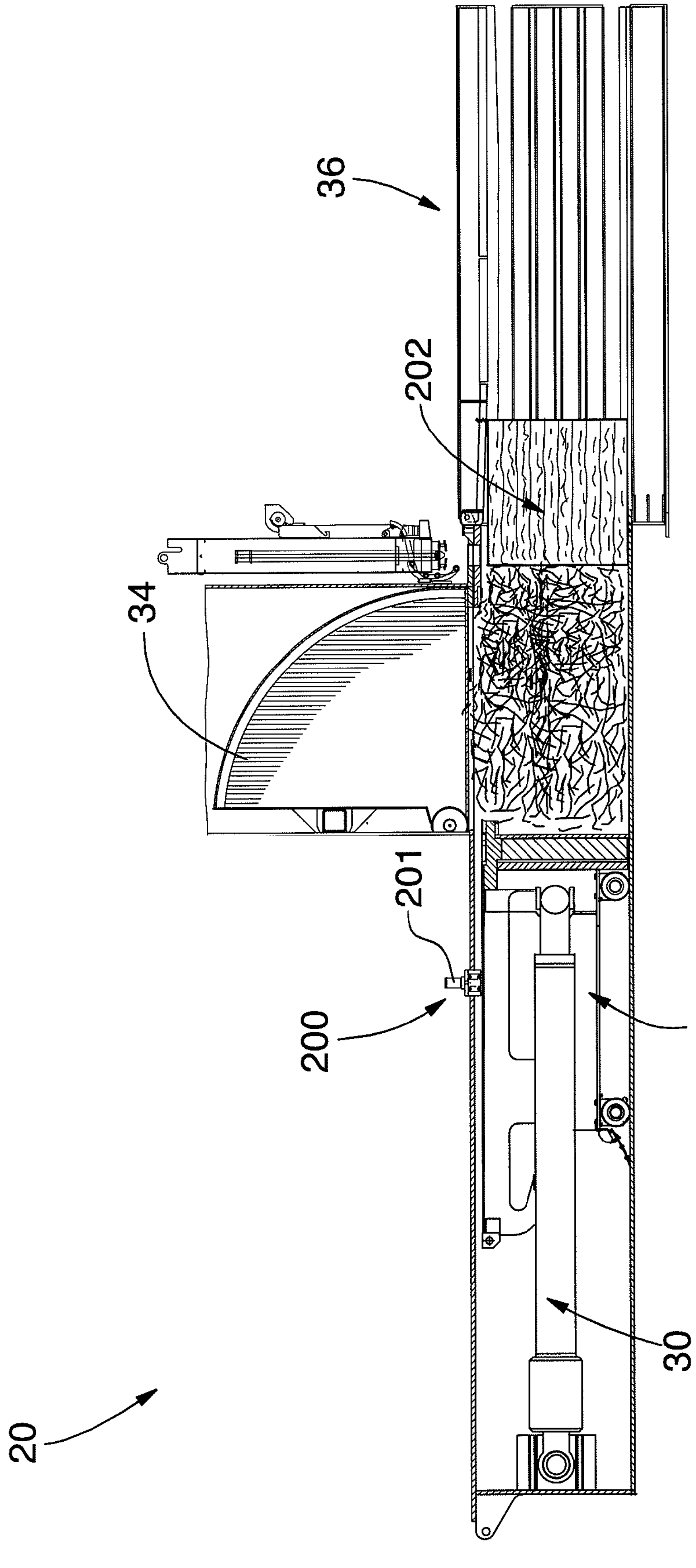

In a first step, the hydraulic actuator 30 and the ram assembly 28 are in retracted position and the preflap assembly 34 is in open position (shown in FIG. 22A). In this retracted position, the ram 28 and the preflap assembly 34 leave the opening 52 open for the recycled material to travel from the feeding assembly 32 to the compaction chamber 26, via the opening 52 to fill the compaction chamber 26 (shown in FIG. 22B). In one embodiment, the preflap assembly 34 is closed for precompacting the recycled material in the compaction chamber 26 (shown in FIG. 22C). The hydraulic actuator 30 is then activated to move the ram 28 from the back end 40 of the housing 22 toward the front end 42 thereof, until it reaches the tying position.

As the ram 28 moves from the retracted position towards the tying position, it pushes the recycled material frontwardly, towards the extrusion channel 36. A bale of material 202 present in the extrusion channel 36 provides a vertical surface against which the recycled material can be compacted.

The actuator 30 is then operated to move back from the tying position to the retracted position for receiving additional recycled material in the compaction chamber 26 (shown in FIG. 22A). The actuator is further operated to move towards the tying position for compacting the additional material fed in the compaction chamber 26. The reciprocation cycle between the retracted and tying positions is repeated until a sufficient amount of recycled material has been compacted.

Figure 22D:
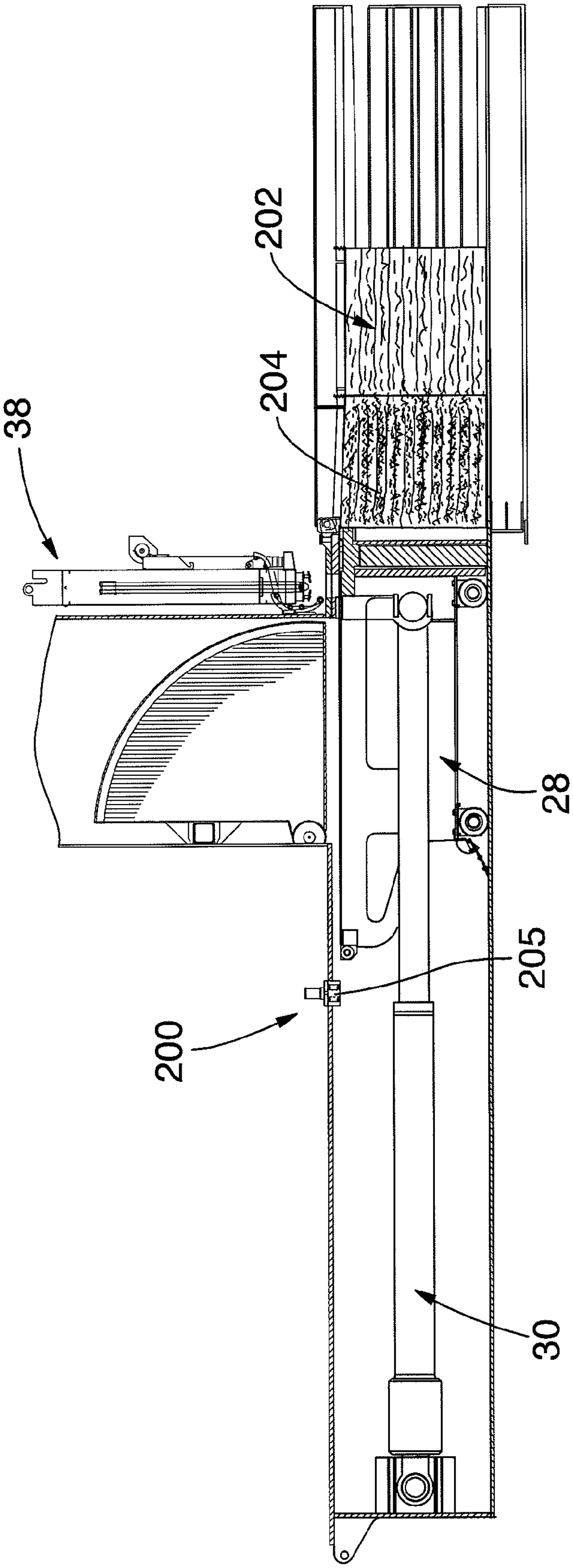
Figure 22E:
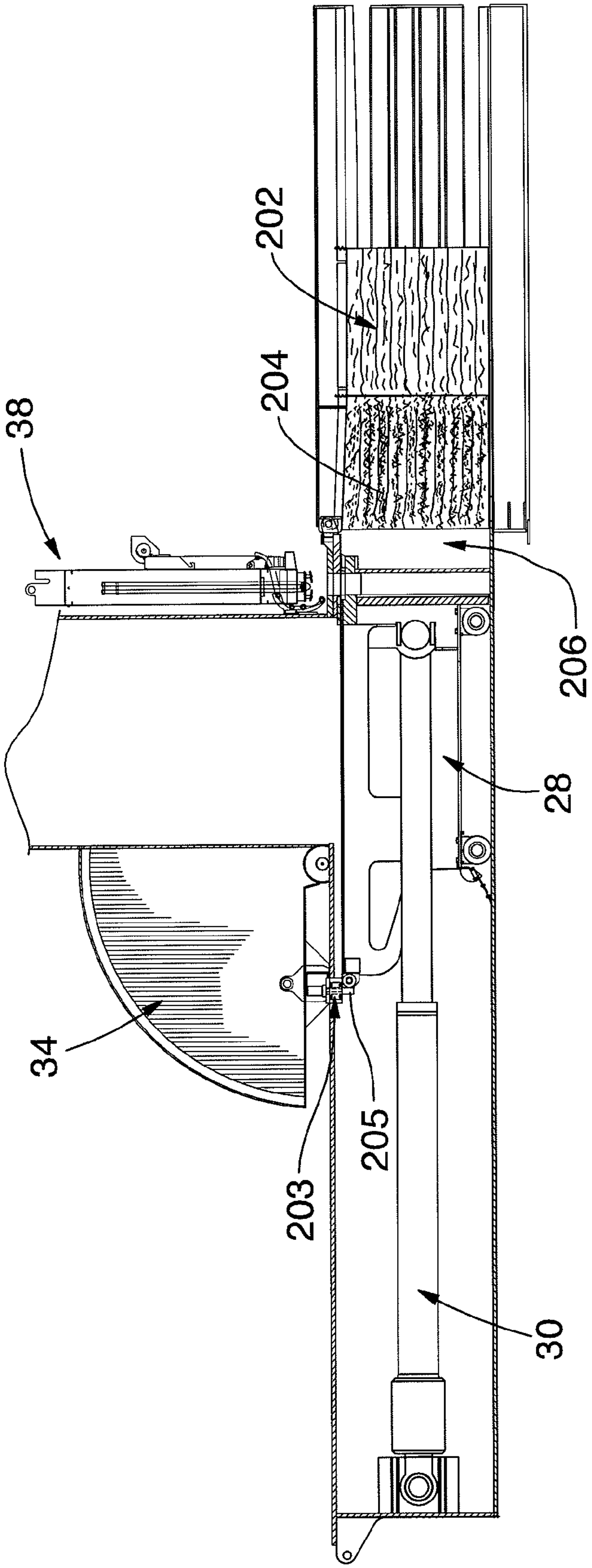
Figure 22F:
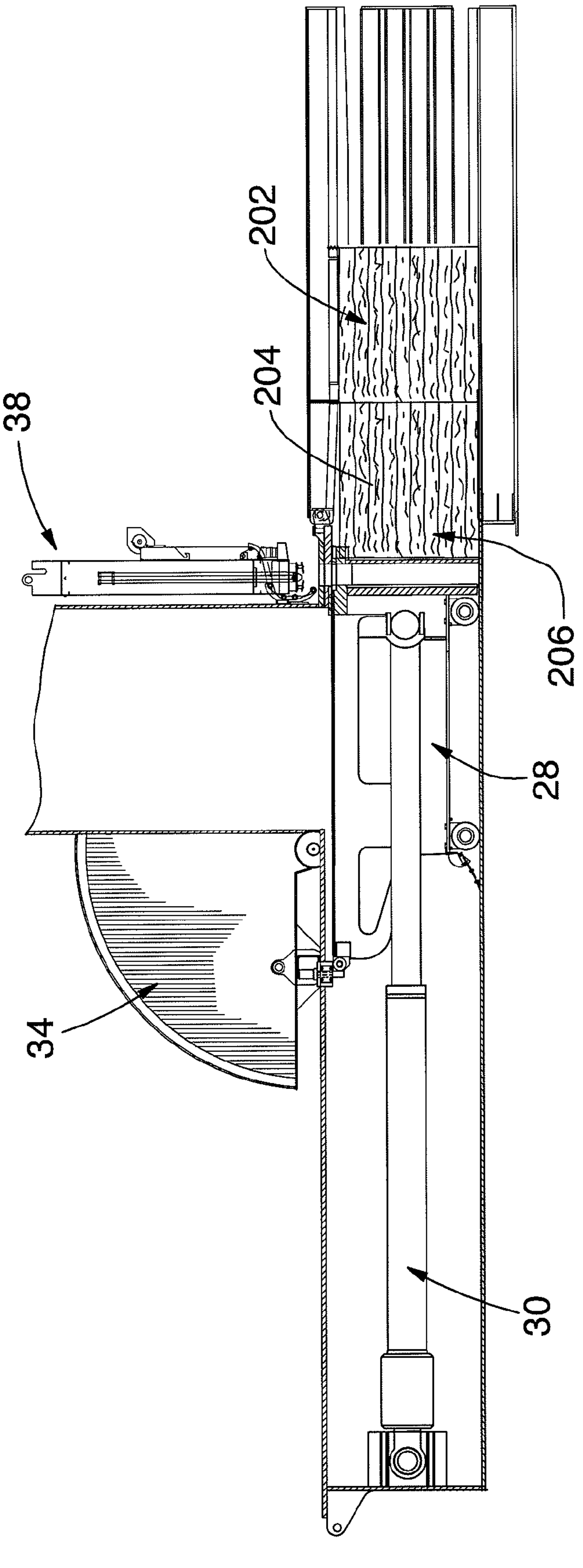
Figure 22G:
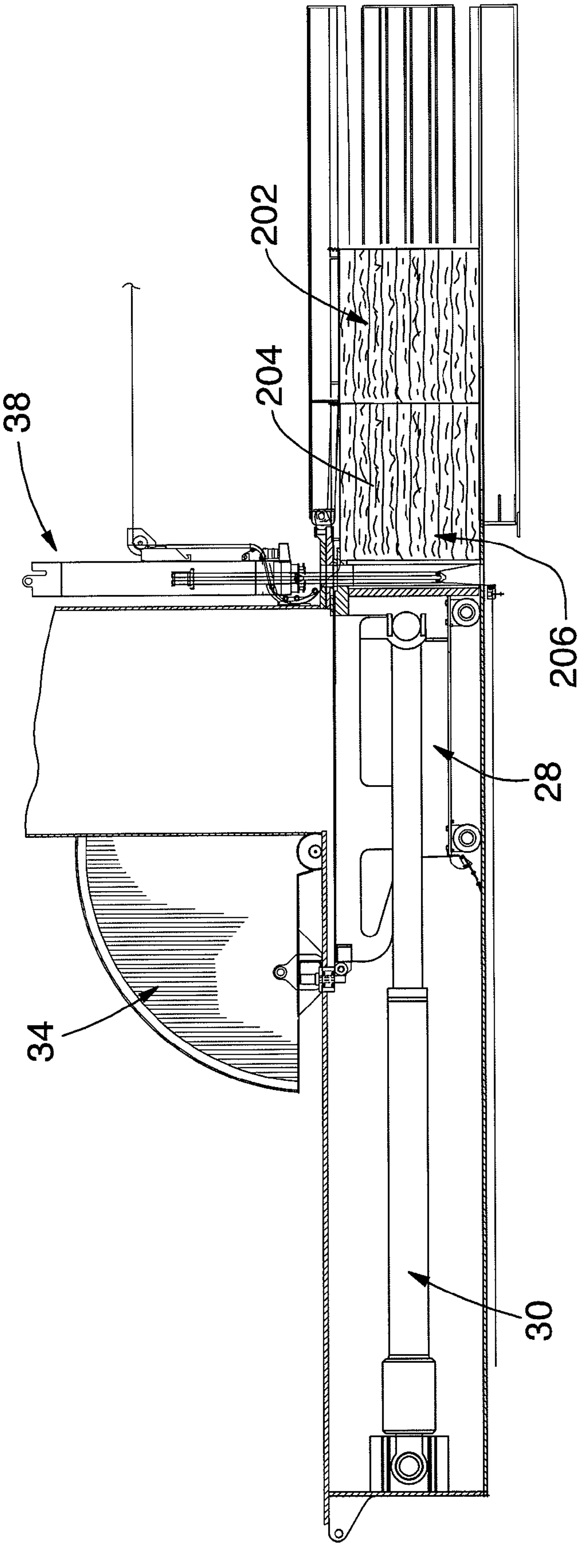
Figure 22H:
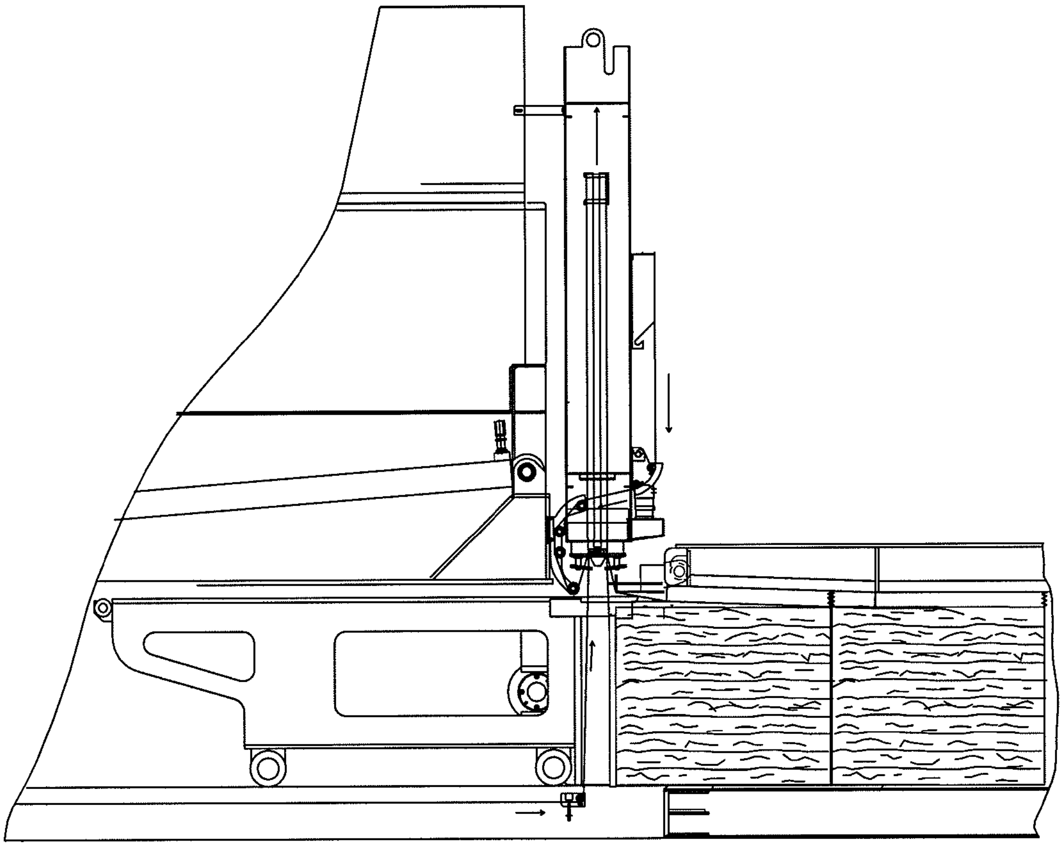
Figure 22I:
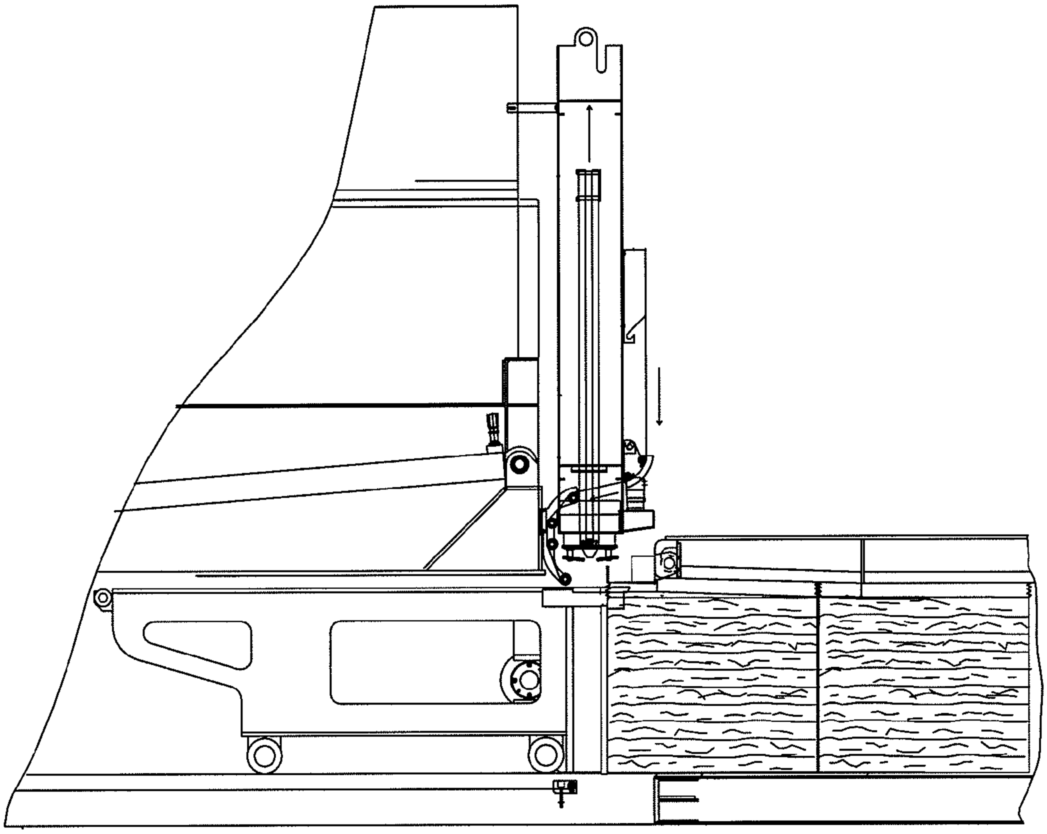

Once a sufficient amount of material has been baled, the ram 28 is actuated towards the overstroke position to further compact the material (FIG. 22D). The actuator 30 is then operated to move from the overstroke position back to the tying position (shown in FIG. 22E), where the lock mechanism 200 is actuated to prevent the ram from moving further backwardly. More specifically, the hydraulic actuator 201 of the lock mechanism 200 is actuated to move from the retracted position toward the extended position for the lock pin 205 to lie against the back end 144 of the ram 28. As the ram 28 moves slightly backward toward the tying position, a void 206 is created between the ram 28 in tying position and the bale 204. This void 206 enables the compacted material to expand back toward the ram 28 in tying position. As such, the ram 28 is maintained in the tying position for a period of time sufficient for the recycled material to expand back and fill the void (shown in FIG. 22F).

Once the recycled material has sufficiently expanded, the wire-catch assembly 38 is operated for wiring the bale 204. More specifically, the needles 56 are sequentially moved down through holes 54*a*-54*e* of the top wall 50, the wire-catch slots 186*a*-186*e* and 192*a*-192*e* and the grooves 168*a*-168*e* to catch the wires. The needles 56 are then moved upwardly along with the wires catched thereby (shown in FIGS. 22G and 22H) prior being twisted (shown in FIG. 22I) as known in the art. In one embodiment, the duration of the period required for enabling sufficient expansion of the bales 204 corresponds to the period of time required for the needles 56 to sequentially move down through holes 54*a*-54*e* of the top wall 50, the wire-catch slots 186*a*-186*e* and 192*a*-192*e* and the grooves 168*a*-168*e* to catch the wires and to return outside the housing 22 with the top wires and the bottom wires, or, in other words, for the needle to complete a reciprocation cycle (shown in FIGS. 22G and 22H).

A person skilled in the art will appreciate that the time required for enabling sufficient expansion of the bale will vary based on the nature of the baled material and the type and number of wires used for tying the bale. As such, the expansion period required may be longer than a reciprocation cycle of the needles and require an additional period of time varying, for instance, between 0 and 15 additional seconds. Therefore, this configuration of the bales 20 enables expansion of the bales material without the need of enlarging the cross-section of the extrusion channel 36 or managing to force the other bales downstream in the extrusion channel 36 for accommodating expansion. A person skilled in the art will nevertheless understand that, due to the fact that the extrusions channel 36 is floating along its entire length, one may choose to modify the cross-section of the extrusion channel 36 concurrently or sequentially for providing additional room for bale expansion.

The fact that the recycled material is allowed to expand back into the void 206 prior to wiring the same tends to reduce the overall expansion forces exerted by the bale 206 on the wires. Therefore, this particular configuration of the baler 20 enables the use of only one wire-catch assembly (e.g. wire-catch assembly 38) while avoiding unwanted rapture of the wire caused by bale expansion forces.

A person skilled in the art will appreciate that the baled 20 may also find used with recycled material having lower expansion coefficients such as, for instance, cardboard and paper. In such an embodiment, the actuator 30 and the ram 28 connected thereto may be operated to move only between the retracted and tying positions.

As further bales of recycled material are formed, the bales of material formed previously are forced to move from the back end 60 of the extrusion channel 36 toward the front end 62 thereof. The velocity of the bales (e.g. bale 204) in the extrusion channel 36 is controlled by modulating the frictional engagement between the top, bottom and side walls 64-70 of the extrusion channel and the bale 204. A person skilled in the art will appreciate that, where frictional engagement is increased, the speed of the bales through the extrusion channel 36 will be reduced and the bales formed will tend to be denser. At the opposite, where frictional engagement is reduced, the bales will travel faster through the extrusion channel 36 and the newly formed bales will tend to have a lower density. Therefore, it may be desirable to modulate the frictional engagement between the bales and the extrusion channel 36.

To do so, the hydraulic cylinder 126 of the clamp assembly 124 is operated to move between the retracted position (shown in FIGS. 8, 10 and 12) and the extended position (shown in FIGS. 9, 11 and 13). As the hydraulic cylinder 126 moves towards the extended position, it forces the connecting members 140 upwardly, which in turn causes the wall supporting member 134 to pivot relative to the pivot bracket 120. The actuation of the hydraulic cylinder 126 thus causes the top, and side wall 66-70 to move toward one another, thereby narrowing the extrusion channel 36 and increasing the resistance with the bales traveling therethrough. At the opposite, retracting of the hydraulic cylinder 126 will cause the top and side walls 66-70 to move away from one another, thereby reducing the frictional contact of the extrusion channel and the bales traveling therethrough.

Although the foregoing description and accompanying drawings relate to specific preferred embodiments of the present invention as presently contemplated by the inventor, it will be understood that various changes, modifications and adaptations, may be made.

The invention claimed is:

1. A single ram baler for baling a material comprising:

(a) a generally horizontal housing defining a compaction chamber therein, and comprising an opening for feeding said material in said chamber;

(b) a wire-catch assembly operatively mounted to said housing;

(c) a ram mounted for reciprocation in said housing; and (d) an actuator operatively connected to said housing and said ram, said actuator is configured:

to reciprocate said ram between a retracted position and a tying position for compacting said material fed in said compaction chamber against a previously formed bale present in said baler until a sufficient amount of material has been compacted into a second bale, said tying position being in alignment with said wire-catch assembly;

to move said ram from said retracted position toward an overstroke position located beyond said tying position for further compacting said second bale; and to move said ram from said overstroke position directly toward said tying position, wherein when said ram moves directly from said overstroke position toward said tying position, said second bale is allowed to expand to contact a front surface of said ram at said tying position have been added and said wire-catch assembly is operable to wire said bale.

2. The single ram baler of claim 1, wherein said actuator comprises a hydraulic actuator.

3. The single ram baler of claim 2, wherein said hydraulic actuator has a capacity ranging from about 10 metric tons to about 500 metric tons.

4. The single ram baler of claim 3, wherein said hydraulic actuator has a capacity ranging from about 50 metric tons to about 300 metric tons.

5. The single ram baler of claim 4, wherein said hydraulic actuator has a capacity ranging from about 100 metric tons to about 200 metric tons.

6. The single ram baler of claim 1, wherein said single ram baler comprises at least one of a preflap assembly and a shear blade assembly.

7. The single ram baler of claim 1, wherein said single ram baler further comprises a lock mechanism adapted to maintain said ram in said tying position.

8. The single ram baler of claim 1, further comprising an extrusion channel operatively mounted to said housing, said extrusion channel being adapted for resisting the passage of said material when said press ram moves from said retracted position to said tying position, thereby allowing said material to be compacted into said second bale.

9. The single ram baler of claim 8, wherein said extrusion channel comprises a bottom wall, a top wall and a pair of side walls, each of said walls having a front end and a back end in connection with a front end of said housing.

10. The single ram baler of claim 9, wherein at least one of said walls comprises a movable wall.

11. The single ram baler of claim 10, wherein said at least one movable wall is connected to said housing via a hinge assembly.

12. The single ram baler of claim 11, wherein said hinge assembly comprises a bracket assembly on said front end of said housing, a elongated hole extending through said at least one movable wall, at said back end thereof, and a rod fixedly mounted to said bracket assembly and extending through said elongated hole for allowing movement of said back end of said at least one movable wall relative to said housing.

13. The single ram baler of claim 12, the extrusion channel further comprising a clamp assembly for causing a portion of said at least one movable wall to move between an open position and a close position.

14. The single ram baler of claim 13, wherein said portion comprises at least one of said front end of said at least one wall and said back end of said at least one wall.

15. The single ram baler of claim 1, wherein said wire-catch assembly is selected from a group consisting of a horizontal wire catch assembly and a vertical wire catch assembly.

16. The single ram baler of claim 1, wherein said material comprises a recycled material.

17. The single ram baler of claim 16, wherein said recycled material is selected from a group consisting of paper, cardboard, plastic, metal and fabric.

* * * * *